(12) United States Patent
Bhat et al.

(10) Patent No.: US 10,198,845 B1
(45) Date of Patent: Feb. 5, 2019

(54) METHODS AND SYSTEMS FOR ANIMATING FACIAL EXPRESSIONS

(71) Applicant: LoomAi, Inc., San Francisco, CA (US)

(72) Inventors: Kiran Bhat, San Francisco, CA (US); Mahesh Ramasubramanian, La Cañada, CA (US); Michael Palleschi, San Francisco, CA (US); Andrew A. Johnson, Minneapolis, MN (US); Ian Sachs, Larkspur, CA (US)

(73) Assignee: LoomAi, Inc., San Francisco, CA (US)

( * ) Notice: Subject to any disclaimer, the term of this patent is extended or adjusted under 35 U.S.C. 154(b) by 0 days.

(21) Appl. No.: 15/992,114

(22) Filed: May 29, 2018

Related U.S. Application Data

(60) Provisional application No. 62/677,586, filed on May 29, 2018.

(51) Int. Cl.
*G06T 15/00* (2011.01)
*G06T 13/40* (2011.01)
*G06K 9/00* (2006.01)

(52) U.S. Cl.
CPC .......... *G06T 13/40* (2013.01); *G06K 9/00308* (2013.01); *G06K 9/00315* (2013.01)

(58) Field of Classification Search
CPC ... G06T 13/40; G06T 13/205; G06F 17/2785; G06K 9/00248; G06K 9/00281; G06K 9/00308; G10L 25/48
USPC ....................................................... 345/419
See application file for complete search history.

(56) References Cited

U.S. PATENT DOCUMENTS

| 6,047,078 | A | 4/2000 | Kang |
| 6,088,042 | A | 7/2000 | Handelman et al. |
| 6,278,466 | B1 | 8/2001 | Chen |
| 6,466,215 | B1 | 10/2002 | Matsuda et al. |
| 6,535,215 | B1 | 3/2003 | Wideman et al. |
| 6,552,729 | B1 | 4/2003 | Di Bernardo et al. |
| 6,554,706 | B2 | 4/2003 | Kim et al. |
| 6,556,196 | B1 * | 4/2003 | Blanz ................. G06K 9/00275 345/419 |
| 6,700,586 | B1 | 3/2004 | Demers |
| 6,714,200 | B1 | 3/2004 | Talnyking |

(Continued)

FOREIGN PATENT DOCUMENTS

| EP | 1884896 A2 | 2/2008 |
| KR | 20140033088 A | 3/2014 |

(Continued)

OTHER PUBLICATIONS

Salazar A, Wuhrer S, Shu C, Prieto F. Fully automatic expression-invariant face correspondence. Machine Vision and Applications. May 1, 2014;25(4):859-79.*

(Continued)

*Primary Examiner* — Phu K Nguyen
(74) *Attorney, Agent, or Firm* — KPPB LLP

(57) ABSTRACT

Systems and methods for animating expressions of 3D models from captured images of a user's face in accordance with various embodiments of the invention are disclosed. In many embodiments, expressions are identified based on landmarks from images of a user's face. In certain embodiments, weights for morph targets of a 3D model are calculated based on identified landmarks and/or weights for predefined facial expressions to animate expressions for the 3D model.

20 Claims, 13 Drawing Sheets

(56) References Cited

U.S. PATENT DOCUMENTS

| | | | |
|---|---|---|---|
| 7,149,330 B2 | 12/2006 | Liu et al. | |
| 7,168,953 B1 | 1/2007 | Poggio et al. | |
| 7,209,139 B1 | 4/2007 | Keet et al. | |
| 7,372,536 B2 | 5/2008 | Shah et al. | |
| 7,433,490 B2 | 10/2008 | Huang et al. | |
| 7,522,165 B2 | 4/2009 | Weaver | |
| 7,859,546 B2 | 12/2010 | Gornowicz et al. | |
| 7,937,253 B2 | 5/2011 | Anast et al. | |
| 8,004,519 B2 | 8/2011 | Gornowicz et al. | |
| 8,035,643 B2 | 10/2011 | Pighin et al. | |
| 8,112,254 B1 | 2/2012 | Bhat et al. | |
| 8,130,225 B2 | 3/2012 | Sullivan et al. | |
| 8,144,153 B1 | 3/2012 | Sullivan et al. | |
| 8,174,528 B1 | 5/2012 | Conran et al. | |
| 8,199,152 B2 | 6/2012 | Sullivan et al. | |
| 8,237,729 B1 | 8/2012 | Hery | |
| 8,390,628 B2 | 3/2013 | Harding et al. | |
| 8,537,164 B1 | 9/2013 | Pighin et al. | |
| 8,542,236 B2 | 9/2013 | Sullivan et al. | |
| 8,553,037 B2* | 10/2013 | Smith | G06T 13/40 345/473 |
| 8,610,716 B1 | 12/2013 | Conran et al. | |
| 8,614,714 B1 | 12/2013 | Koperwas et al. | |
| 8,624,904 B1 | 1/2014 | Koperwas et al. | |
| 8,649,555 B1 | 2/2014 | Bhat et al. | |
| 8,659,596 B2 | 2/2014 | Corazza et al. | |
| 8,666,119 B1 | 3/2014 | Bhat et al. | |
| 8,681,158 B1 | 3/2014 | Sullivan et al. | |
| 8,704,832 B2 | 4/2014 | Aguiar et al. | |
| 8,744,121 B2 | 6/2014 | Polzin et al. | |
| 8,749,556 B2 | 6/2014 | De Aguiar et al. | |
| 8,786,610 B1 | 7/2014 | Pighin et al. | |
| 8,797,328 B2 | 8/2014 | Corazza et al. | |
| 8,854,376 B1 | 10/2014 | Bhat et al. | |
| 8,860,731 B1 | 10/2014 | Cohen Bengio et al. | |
| 8,913,839 B2* | 12/2014 | Ricanek, Jr. | G06K 9/00221 382/159 |
| 8,928,672 B2 | 1/2015 | Corazza et al. | |
| 8,928,674 B1 | 1/2015 | Sullican et al. | |
| 8,941,665 B1 | 1/2015 | Sullivan et al. | |
| 8,982,122 B2 | 3/2015 | Corazza et al. | |
| 8,988,435 B1 | 3/2015 | Cohen Bengio | |
| 9,001,132 B1 | 4/2015 | Bhat et al. | |
| 9,123,175 B1 | 9/2015 | Goldenthal et al. | |
| 9,142,055 B1 | 9/2015 | Bhat et al. | |
| 9,165,393 B1 | 10/2015 | Low et al. | |
| 9,183,660 B2 | 11/2015 | Koperwas et al. | |
| 9,196,074 B1 | 11/2015 | Bhat et al. | |
| 9,256,973 B2 | 2/2016 | Koperwas et al. | |
| 9,317,740 B2* | 4/2016 | Ricanek, Jr. | G06K 9/00288 |
| 9,317,954 B2 | 4/2016 | Li et al. | |
| 9,342,912 B1 | 5/2016 | Pighin et al. | |
| 9,508,178 B2 | 11/2016 | Jutan et al. | |
| 9,508,179 B2 | 11/2016 | Jutan et al. | |
| 9,600,742 B2 | 3/2017 | Yu et al. | |
| 9,626,788 B2* | 4/2017 | Corazza | G06T 13/40 |
| 9,721,385 B2 | 8/2017 | Herman | |
| 9,747,495 B2* | 8/2017 | Corazza | G06T 13/40 |
| 9,786,084 B1* | 10/2017 | Bhat | G06T 7/11 |
| 9,792,479 B2 | 10/2017 | Mallet et al. | |
| 9,898,849 B2* | 2/2018 | Du | G06T 13/205 |
| 9,916,538 B2* | 3/2018 | Zadeh | G06K 9/627 |
| 10,062,198 B2 | 8/2018 | Bhat et al. | |
| 2002/0050988 A1 | 5/2002 | Petrov et al. | |
| 2003/0164829 A1 | 9/2003 | Bregler et al. | |
| 2003/0169907 A1 | 9/2003 | Edwards et al. | |
| 2003/0208116 A1 | 11/2003 | Liang et al. | |
| 2003/0215130 A1 | 11/2003 | Nakamura et al. | |
| 2004/0021660 A1 | 2/2004 | Ng-Thow-Hing et al. | |
| 2004/0049309 A1 | 3/2004 | Gardner et al. | |
| 2004/0210427 A1 | 10/2004 | Marschner et al. | |
| 2004/0218894 A1 | 11/2004 | Harville et al. | |
| 2004/0227752 A1 | 11/2004 | McCartha et al. | |
| 2005/0062739 A1 | 3/2005 | Balmelli et al. | |
| 2005/0264572 A1 | 12/2005 | Anast et al. | |
| 2006/0002631 A1 | 1/2006 | Fu et al. | |
| 2006/0109274 A1 | 5/2006 | Alvarez et al. | |
| 2006/0126924 A1 | 6/2006 | Liu et al. | |
| 2006/0134585 A1 | 6/2006 | Adamo-villani et al. | |
| 2006/0171590 A1 | 8/2006 | Lu et al. | |
| 2006/0228040 A1 | 10/2006 | Simon et al. | |
| 2006/0245618 A1 | 11/2006 | Boregowda et al. | |
| 2006/0267978 A1 | 11/2006 | Litke et al. | |
| 2007/0091085 A1 | 4/2007 | Wang et al. | |
| 2007/0104351 A1 | 5/2007 | Yang et al. | |
| 2007/0167779 A1 | 7/2007 | Kim et al. | |
| 2007/0182736 A1 | 8/2007 | Weaver | |
| 2008/0002862 A1 | 1/2008 | Matsugu et al. | |
| 2008/0024487 A1 | 1/2008 | Isner et al. | |
| 2008/0030497 A1 | 2/2008 | Hu et al. | |
| 2008/0031512 A1 | 2/2008 | Mundermann et al. | |
| 2008/0043021 A1 | 2/2008 | Huang et al. | |
| 2008/0152213 A1 | 6/2008 | Medioni et al. | |
| 2008/0158224 A1 | 7/2008 | Wong et al. | |
| 2008/0170077 A1 | 7/2008 | Sullivan et al. | |
| 2008/0170078 A1 | 7/2008 | Sullivan et al. | |
| 2008/0180448 A1 | 7/2008 | Anguelov et al. | |
| 2008/0187213 A1 | 8/2008 | Zhang et al. | |
| 2008/0187246 A1 | 8/2008 | Del Valle | |
| 2008/0252596 A1 | 10/2008 | Bell et al. | |
| 2008/0284779 A1 | 11/2008 | Gu et al. | |
| 2009/0027337 A1 | 1/2009 | Hildreth | |
| 2009/0067730 A1 | 3/2009 | Schneiderman | |
| 2009/0195544 A1 | 8/2009 | Wrinch | |
| 2009/0196466 A1 | 8/2009 | Capata et al. | |
| 2009/0196475 A1 | 8/2009 | Demirli et al. | |
| 2009/0202114 A1 | 8/2009 | Morin et al. | |
| 2009/0202144 A1 | 8/2009 | Taub et al. | |
| 2009/0231347 A1 | 9/2009 | Omote | |
| 2010/0007665 A1 | 1/2010 | Smith et al. | |
| 2010/0020073 A1 | 1/2010 | Corazza et al. | |
| 2010/0073361 A1 | 3/2010 | Taylor et al. | |
| 2010/0134490 A1 | 6/2010 | Corazza et al. | |
| 2010/0141662 A1 | 6/2010 | Storey et al. | |
| 2010/0149179 A1 | 6/2010 | Aguiar et al. | |
| 2010/0203968 A1 | 8/2010 | Gill et al. | |
| 2010/0235045 A1 | 9/2010 | Craig et al. | |
| 2010/0238182 A1 | 9/2010 | Geisner et al. | |
| 2010/0253703 A1 | 10/2010 | Ostermann | |
| 2010/0259547 A1 | 10/2010 | de Aguiar et al. | |
| 2010/0271366 A1 | 10/2010 | Sung et al. | |
| 2010/0278405 A1 | 11/2010 | Kakadiaris et al. | |
| 2010/0285877 A1 | 11/2010 | Corazza | |
| 2011/0292034 A1 | 12/2011 | Corazza et al. | |
| 2011/0296331 A1 | 12/2011 | Iyer et al. | |
| 2011/0304622 A1 | 12/2011 | Rogers et al. | |
| 2011/0304629 A1 | 12/2011 | Winchester et al. | |
| 2012/0019517 A1 | 1/2012 | Corazza et al. | |
| 2012/0038628 A1 | 2/2012 | Corazza et al. | |
| 2012/0130717 A1 | 5/2012 | Xu et al. | |
| 2012/0327091 A1 | 12/2012 | Eronen et al. | |
| 2013/0021348 A1 | 1/2013 | Corazza et al. | |
| 2013/0100140 A1 | 4/2013 | Ye et al. | |
| 2013/0127853 A1 | 5/2013 | Corazza et al. | |
| 2013/0215113 A1 | 8/2013 | Corazza et al. | |
| 2013/0235045 A1 | 9/2013 | Corazza et al. | |
| 2013/0257877 A1 | 10/2013 | Davis et al. | |
| 2013/0271451 A1 | 10/2013 | Tong et al. | |
| 2013/0311412 A1 | 11/2013 | Lazar et al. | |
| 2014/0035934 A1 | 2/2014 | Du et al. | |
| 2014/0043329 A1 | 2/2014 | Wang et al. | |
| 2014/0160116 A1 | 6/2014 | de Aguiar et al. | |
| 2014/0204084 A1 | 7/2014 | Corazza et al. | |
| 2014/0285496 A1 | 9/2014 | de Aguiar et al. | |
| 2014/0313192 A1 | 10/2014 | Corazza et al. | |
| 2014/0313207 A1 | 10/2014 | Taylor et al. | |
| 2015/0145859 A1 | 5/2015 | Corazza et al. | |
| 2015/0193975 A1 | 7/2015 | Corazza et al. | |
| 2015/0262405 A1 | 9/2015 | Black et al. | |
| 2015/0358613 A1 | 12/2015 | Sandrew et al. | |
| 2015/0363634 A1 | 12/2015 | Yin et al. | |
| 2016/0328384 A1 | 11/2016 | Divakaran et al. | |

(56) References Cited

U.S. PATENT DOCUMENTS

| | | |
|---|---|---|
| 2017/0053663 A1 | 2/2017 | Yu et al. |
| 2017/0372505 A1 | 12/2017 | Bhat et al. |
| 2018/0174348 A1 | 6/2018 | Bhat et al. |

FOREIGN PATENT DOCUMENTS

| | | |
|---|---|---|
| WO | 2007132451 A2 | 11/2007 |
| WO | 2009007701 A1 | 1/2009 |
| WO | 2010060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |
| WO | 2017223530 A1 | 12/2017 |

OTHER PUBLICATIONS

Booth J, Roussos A, Zafeiriou S, Ponniah A, Dunaway D. A 3d morphable model learnt from 10,000 faces. InProceedings of the IEEE Conference on Computer Vision and Pattern Recognition 2016 (pp. 5543-5552).*

Zulqarnain Gilani S, Shafait F, Mian A. Shape-based automatic detection of a large number of 3D facial landmarks. InProceedings of the IEEE conference on computer vision and pattern recognition 2015 (pp. 4639-4648).*

Kahler et al., "Head Shop: Generating Animated Head Models with Anatomical Structure", ACM SIGGRAPH Symposium on Computer Animation, Jul. 21, 2002, 10 pgs.

Kalogerakis, "Machine Learning Algorithms for Geometry Processing by Example", Thesis, 2010, 178 pgs.

Laine et al., "Production-Level Facial Performance Capture Using Deep Convolutional Neural Networks", arXiv:1609.06536 [cs.CV], Jun. 2, 2017, retrieved from https://arxiv.org/abs/1609.06536 on Jul. 20, 2017, 10 pgs.

Larsson, "Morph targets and bone rigging for 3D facial animation", Bachelor's Thesis in Game Design, 15 hp Program: Speldesign och grafik, Jun. 2017, 31 pgs.

Lewis, "H.264/MPEG-4 AVC CABAC overview", printed Jun. 24, 2013 from http://www.web.archive.org/web/20121025003926/www.theonlineoasis.co.uk/notes.html, 3 pgs.

Lewis et al., "Pose Space Deformation: A Unified Approach to Shape Interpolation and Skeleton-Drive Deformation", Proceedings of ACM SIGGRAPH, Jul. 1, 2000, pp. 165-172.

Liepa, "Filing Holes in Meshes", Proc. of the Eurographics/ ACM SIGGRAPH Symposium on Geometry Processing, Jun. 23, 2003, 8 pgs.

Lin, M. et al., "Network in network", arXiv: 1312.4400 [cs.NE], Dec. 18, 2013, 9 pgs.

Liu et al., "3D Motion Retrieval with Motion Index Tree", Computer Vision and Image Understanding, Jun. 1, 2003, vol. 92, pp. 265-284.

Lum et al., "Combining Classifiers for Bone Fracture Detection in X-Ray Images", Image Processing, 2005. ICIP 2005. IEEE International Conference on (vol. 1) Date of Conference: Sep. 11-14, 2005, 4 pgs.

Ma et al., "An Invitation to 3D Vision", Springer Verlag, Chapter 2, 2004, pp. 15-28.

Mamou et al., "Temporal DCT-based compression of 3D dynamic meshes", ICCOM'06 Proceedings of the 10th WSEAS international conference on Communications, Jul. 10-12, 2006, 6 pgs.

Mamou et al., "The New MPEG-4/FAMC Standard for Animated 3D Mesh Compression", IEEE 3DTV-CON'08, May 28-30, 2008, pp. 97-100.

Marsella, Stacy et al., "Virtual Character Performance From Speech", Proceedings of the 12th ACM SIGGRAPH/Eurographics Symposium on Computer Animation. ACM, Jul. 19, 2013, 11 pgs.

Mekhilef et al., "Automatic Face Recognition System", The Institution of Engineers, Malaysia vol. 69, No. 2; Publication, Jun. 2, 2008, 9 pgs.

Mohr et al., "Building Efficient, Accurate Character Skins from Examples", ACM Transactions on Graphics, Jul. 27, 2003, vol. 22, No. 3, pp. 562-568.

Noh et al., "Expression Cloning", Proceedings of ACM SIGGRAPH, Aug. 12-17, 2001, published Aug. 1, 2001, 12 pgs.

Okada et al., "A Video Motion Capture System for Interactive Games.", MVA2007 IAPR Conference on Machine Vision Applications, May 16-18, 2007, pp. 186-189.

Park et al., "On-line locomotion generation based on motion blending", ACM SIGGRAPH Symposium on Computer Animation, Jul. 21, 2002, 8 pgs.

Park et al., "On-line motion blending for real-time locomotion generation", Computer Animation & Virtual Worlds, Jun. 16, 2004, vol. 15, pp. 125-138.

Persson, "ExMS: an animated and avatar-based messaging system for expressive peer communication", Group '03, Nov. 9-12, 2003, published Nov. 9, 2003, pp. 31-39.

Rotenberg, "Facial Expressions & Rigging", CSE169: Computer Animation, Instructor: Steve Rotenberg, UCSD, Spring 2016, 59 pgs.

Safonova et al., "Construction and optimal search of interpolated motion graphs", ACM SIGGRAPH, Jul. 2007, vol. 26, Issue 3, Article 106, published Aug. 8, 2007, 11 pgs.

Sand et al., "Continuous Capture of Skin Deformation", ACM Transactions on Graphics, vol. 22, No. 3, Jul. 27, 2003, pp. 578-586.

Seitz et al., "A Comparison and Evaluation of Multi-View Stereo Reconstruction Algorithms", Computer Vision and Pattern Recognition, 2006 IEEE Computer Society Conference on. vol. 1. IEEE, Jun. 17, 2006, 8 pgs.

Seo et al., "An Automatic Modeling of Human Bodies from Sizing Parameters", In Symposium on Interactive 3D Graphics, Apr. 27, 2003, 9 pgs.

Sloan et al., "Shape by Example", In 2001 Symposium on Interactive 3D Graphics, Mar. 1, 2001, pp. 135-143.

Smola et al., "A Tutorial on support Vector Regression", In Technical Report NC2-TR-1998-030, NeuroCOLT2, Oct. 1998, 73 pgs.

Smola et al., "A Tutorial on Support Vector Regression", Statistics and Computing, Aug. 1, 2004, vol. 14, Issue 3, pp. 199-222.

Sumner et al., "Deformation Transfer for Triangle Meshes", Proceedings of ACM SIGGRAPH 2004, 23(3), Aug. 8, 2004, pp. 399-405.

Szegedy et al., "Going deeper with convolutions", 2015 IEEE Conference on Computer Vision and Pattern Recognition (CVPR), Jun. 7-12, 2015, pp. 1-9.

Szliski et al., "Matching 3D Anatomical Surfaces with Non-rigid Deformations Using Octree-Splines", International Journal of Computer Vision, May 1, 1996, vol. 18, No. 22, pp. 171-186.

Taylor et al., "Modeling Human Motion Using Binary Latent Variables", Proc. of Advances in Neural Information Processing Systems (NIPS), 2007, vol. 19, 8 pgs.

Tena et al., "Interactive region-based linear 3d face models", ACM Transactions on Graphics (TOG), vol. 30, No. 4, ACM, Aug. 7, 2011, 9 pgs.

Thies et al., "Face2Face: Real-time Face Capture and Reenactment of RGB Videos", 2016 IEEE Conference on Computer Vision and Pattern Recognition (CVPR), Jun. 27-30, 2016, 9 pgs.

Trigeorgis et al., "Mnemonic descent method: A recurrent process applied for end-to-end face alignment", 2016 IEEE Conference on Computer Vision and Pattern Recognition (CVPR), Jun. 27-30, 2016, 11 pgs.

Tung et al., "Topology Matching for 3D Video Compression", IEEE Conference Computer Vision and Pattern Recognition, Jun. 17-22, 2007, 8 pgs.

Vasilescu et al., "Multilinear Analysis of Image Ensembles: Tensorfaces", European Conference on Computer Vision (ECCV), first online Apr. 29, 2002, 15 pgs.

Viola et al., "Fast multi-view face detection", Proc. of Computer Vision and Pattern Recognition, Jul. 15, 2003, 8 pgs.

Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.

(56) References Cited

OTHER PUBLICATIONS

Vlasic et al., "Face Transfer with Multilinear Models", ACM Transactions on Graphics 24(3), Jul. 31, 2005. pp. 426-433.
Vlasic et al., "Multilinear Models for Face Synthesis", SIGGRAPH Research Sketch, 2004, 1 page.
Von Luxburg, "A Tutorial on Spectral Clustering. Statistics and Computing", arXiv: 0711.0189, Nov. 1, 2007, pp. 1-32.
Wang et al., "Multi-weight Enveloping: Least Squares Approximation Techniques for Skin Animation", ACM SIGGRAPH Symposium on Computer Animation, Jul. 21, 2002, 11 pgs.
Weise et al., "Face/off: Live facial puppetry", Proceedings of the 2009 ACM SIGGRAPH/Eurographics Symposium on Computer animation, Aug. 1, 2009, 10 pgs.
Weise et al., "Realtime performance-based facial animation", ACM Transactions on Graphics (TOG) 30.4, Aug. 7, 2011, Article No. 77, 9 pgs.
Wikipedia, Morph target animation, Last Modified Aug. 1, 2014, Retrieved from http://en.wikipedia.org/wiki/Morph_target_animation on Jan. 16, 2015, 3 pgs.
Xiao et al., "Control of motion in character animation", Proceedings of the Eighth International Conference on Information Visualization, IEEE Computer Society, Jul. 16, 2004, 8 pgs.
Zordan et al., "Dynamic Response for Motion Capture Animation", ACM Transactions on Graphics—Proceedings of ACM SIGGRAPH 2005, vol. 24, Issue 3, Jul. 31, 2005, 5 pgs.
International Search Report and Written Opinion for International Application PCT/US2010/033797, completed Jun. 11, 2010, 5 pgs.
International Search Report and Written Opinion for International Application No. PCT/US2009/057155, completed Dec. 22, 2009, dated Jan. 12, 2010, 10 pgs.
International Search Report and Written Opinion for International Application No. PCT/US2009/065825, completed Jan. 21, 2010, dated Jan. 28, 2010, 9 pgs.
International Search Report and Written Opinion for International Application No. PCT/US2017/039136, Search completed Aug. 21, 2017, dated Sep. 5, 2017, 17 pgs.
International Search Report and Written Opinion for International Application PCT/US2011/045060, completed Nov. 27, 2011, 6 pgs.
U.S. Appl. No. 14/222,390, Non-Final Office Action dated May 22, 2014, 66 pgs.
Written Opinion of the International Searching Authority for International Application No. PCT/US 09/57155, date completed Dec. 22, 2009, dated Jan. 12, 2010, 6 pgs.
Written Opinion of the International Searching Authority for International Application No. PCT/US 09/65825, date completed Jan. 21, 2010, dated Jan. 28, 2010, 6 pgs.
Written Opinion of the International Searching Authority for International Application No. PCT/US2010/033797, filed May 5, 2010, completed Jun. 11, 2010, 4 pgs.
Written Opinion of the International Searching Authority for International Application No. PCT/US2011/045060, completed Nov. 27, 2011, 5 pgs.
Alkawaz et al, "Blend Shape Interpolation and FACS for Realistic Avatar", 3D Research vol. 6, No. 6, Jan. 2015, 11 pgs.
Allen At Al., "The Space of Human Body Shapes: Reconstruction and Parameterization from Range Scans", ACM Transactions on Graphics, Jul. 2004, vol. 22, No. 3, pp. 587-594.
Allen et al., "Articulated Body Deformation from Range Scan Data", ACM Transactions on Graphics, Jul. 21-26, 2002, vol. 21, No., 8 pgs.
Anguelov et al., "Recovering Articulated Object Models from 3D Range Data", In Proceedings of the 20th Conference on Uncertainty in Artificial Intelligence, Jul. 7-11, 2004, pp. 18-26.
Anguelov et al., "SCAPE: Shape Completion and Animation of People", Printed Oct. 14, 2013, from www.robotics.stanford.edu/!drago/projects/scape/scape.html, 1 page.
Anguelov et al., "The Correlated Correspondence Algorithm for Unsupervised Registration of Nonrigid Surfaces", Advance in Neural Information Processing Systems, vol. 17, 8 pgs.
Baran, Llya S., "Using Rigging and Transfer to Animate 3D Characters", Thesis, Sep. 2010, 82 pgs.
Baran et al, "Automatic rigging and animation of 3D characters", ACM Transactions on Graphics (TOG)—Proceedings of ACM SIGGRAPH 2007, Jul. 2007, vol. 26, Issue 3, 8 pgs.
Beaudoin et al., "Adapting Wavelet Compression to Human Motion Capture Clips", Graphics Interface, May 28-30, 2007, pp. 313-318.
Blanz et al., "A morphable model for the synthesis of 3D faces", SIGGRAPH '99 Proceedings of the 26th annual conference on Computer graphics and interactive techniques, Jul. 1, 1999, 8 pgs.
Blanz et al., "Reanimating faces in images and video", EUROGRAPHICS, Sep. 2003, vol. 22, No. 3, 10 pgs.
Bray, "Markerless Based Human Motion Capture: A Survey", Published 2001, Televirtual Ltd., Norwich, UK, 44 pgs.
Buenaposada et al., "Performance Driven Facial Animation Using Illumination Independent Appearance-Based Tracking", Proceedings of ICPR, Hong Kong, Aug. 2006, 4 pgs.
Cheung et al., "Shape-from Silhouette of Articulated Objects and its use for Human Body Kinematics Estimation and Motion Capture", In Conference on Computer Vision and Pattern Recognition (CVPR), Jun. 18-20, 2003, 8 pgs.
Cootes et al., "Active appearance models", Proc. European Conference on Computer Vision, 1998, vol. 2, 16 pgs.
Corazza, Stefano et al., Application U.S. Appl. No. 12/579,334, Notice of Allowance dated Feb. 7, 2014, 7 pgs.
Curio et al., "Semantic 3D Motion Retargeting for Facial Animation", ACM, Jul. 28, 2006, 8 pgs.
Curless et al., "A Volumetric Method of Building Complex Models from Range Images", Proceedings of SIGGRAPH, 1996, pp. 303-312.
Davis et al., "Filing Holes in Complex Surfaces Using Volumetric Diffusion", Symposium on 3D Data Processing, Visualization, and Transmission, Feb. 2002, 11 pgs.
De Aguiar et al., "Automatic Conversion of Mesh Animations into Skeleton-based Animations", EUROGRAPHICS, Apr. 24, 2008, vol. 27, No. 2, 9 pgs.
De Aguiar et al., "Marker-Less 3D Feature Tracking for Mesh-Based Human Motion Capture", Human Motion, Oct. 27, 2007, LNCS 4818, pp. 1-15.
Di Bernardo et al., "Generating Realistic Human Motions from Observations", submitted to Fifth European Conference on Computer Vision, ECCV 1998, pp. 1-12.
Gao et al., "Motion normalization: the preprocess of motion data", VRST '05, Nov. 7-9, 2005, pp. 253-256.
Garland et al., "Surface Simplification Using Quadric Error Metrics", Proceedings of SIGGRAPH, Aug. 3, 1997, 8 pgs.
Goncalves et al., "Reach Out and Touch Space (Motion Learning)", Proceedings, Third IEEE International Conference Apr. 14-16, 1998, 6 pgs.
Grassia, "Believable Automatically Synthesized Motion by Knowledge-Enhanced Motion Transformation", Thesis CMU-CS-00-163, Aug. 21, 2000, 215 pgs.
Grochow et al., "Style-Based Inverse Kinematics", ACM Transactions on Graphics, Aug. 1, 2004, vol. 23, No. 3, pp. 522-531.
Hahnel et al., "An Extension of the ICP Algorithm for Modeling Nonrigid Objects with Mobile Robots", Proceedings of the International Joint Conference on Artificial Intelligence (IJCAI), Aug. 9, 2003, 6 pgs.
He et al., "Deep residual learning for image recognition", arXiv: 1512.03385 [cs.CV], In 2016 IEEE Conference on Computer Vision and Pattern Recognition, Dec. 10, 2015, 12 pgs.
Hilton et al., "From 3D Shape Capture to Animated Models", IEEE Computer Society, First International Symposium on 3D Processing, Visualization and Transmission (3DVPT2002), Jun. 19-21, 2002, 10 pgs.
Isidro et al., "Stochastic Refinement of the Visual Hull to Satisfy Photometric and Silhouette Consistency Constraints", Boston University Computer Science Tech. Report No. 2003-017, Jul. 31, 2003, Accepted to the Ninth International Conference on Computer Vision (ICCV 2003), 14 pgs.
Jones et al., "Fast multi-view face detection", Mitsubishi Electric Research Lab TR-20003-96, Aug. 2003, 11 pgs.

(56) References Cited

OTHER PUBLICATIONS

Ju et al., "Mean Value Coordinates for Closed Triangular Meshes", Proceedings of ACM SIGGRAPH, Jul. 31, 2005, 6 pgs.
Ju, et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pgs.

\* cited by examiner

METHODS AND SYSTEMS FOR ANIMATING FACIAL EXPRESSIONS

CROSS-REFERENCE TO RELATED APPLICATIONS

The present invention claims priority to U.S. Provisional Patent Application Ser. No. 62/677,586, filed May 29, 2018. The disclosure of U.S. Provisional Patent Application Ser. No. 62/677,586 is herein incorporated by reference in its entirety.

FIELD OF THE INVENTION

This invention relates to animating a 3D avatar based upon captured images. More particularly, this invention relates to animating facial expressions for a 3D avatar based on captured images of a user's face and their facial expressions.

BACKGROUND OF THE INVENTION

The animation of computer generated 3D content is becoming increasingly popular. 3D models and avatars are being introduced in many different fields and applications. However, the animation of facial expressions for 3D models can be technically challenging and can require extensive manual animation processes.

SUMMARY OF THE INVENTION

Systems and methods for generating animations for a 3D model in accordance with embodiments of the invention are illustrated. One embodiment includes a set of one or more processors, a memory readable by the set of processors, and instructions stored in the memory that when read by the set of processors directs the set of processors to identify a first set of landmarks from a first set of one or more images of a user's face, identify a neutral frame based on the identified set of landmarks, identify a second set of landmarks from a second set of one or more images of the user's face, classify a facial expression of the user's face in the second set of images based on the identified neutral frame and the second set of landmarks, identify a set of one or more predefined expression weights based on the facial expression, and calculate a set of final morph target weights from the predefined expression weights and the second set of landmarks based on the second set of images, wherein the 3D model is animated based on the calculated set of final morph target weights for morph targets of the 3D model.

In another embodiment, identifying the neutral frame comprises classifying a facial expression of the user's face in the first set of images, adjusting the first set of landmarks for the classified expression to an estimated neutral expression, and setting the adjusted set of landmarks as a neutral expression.

In a further embodiment, classifying a facial expression comprises identifying an expression state based on the identified set of landmarks.

In still another embodiment, adjusting the first set of landmarks comprises identifying an expected ratio between two sets of facial landmarks for the classified facial expression, and adjusting the first set of landmarks based on a difference between the expected ratio for the classified facial expression and an expected ratio for a neutral facial expression.

In a still further embodiment, the first set of landmarks are identified using at least one of a mnemonic descent method (MDM) deep learning approach and an ensemble of regression trees (ERT) approach.

In yet another embodiment, calculating the set of final morph target weights comprises calculating a set of initial morph target weights for the second set of images based on the second set of landmarks, blending the set of initial morph target weights and the predefined expression weights to compute the set of final morph target weights.

In a yet further embodiment, the morph targets of the 3D model comprise a set of one or more base shapes and a set of one or more corrective shapes.

In another additional embodiment, the morph targets of the 3D model are stored in a standardized model file format.

In a further additional embodiment, the instructions further direct the set of processors to adjust the identified neutral frame based on second set of images.

In another embodiment again, the instructions further direct the set of processors to calculate a second set of final morph target weights based on a third set of one or more images, wherein the transition between the first set of final morph target weights and the second set of final morph target weights is based on a linear function to control the rate of morphing between different expressions.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

Turning now to the drawings, systems and methods for animating facial expressions of 3D models from captured images of a user's face in accordance with various embodiments of the invention are illustrated. Systems and processes in accordance with many embodiments of the invention provide a process for identifying landmarks from captured images of a user's face to calculate weights for morph targets of a 3D model in order to animate the expressions of the 3D model. In a number of embodiments, calculating the weights for the morph targets is based on one or more of an identified expressive state of the user's face, a calculated neutral state, and/or identified landmark positions from the user's face. In accordance with some other embodiments, the processes are performed by a "cloud" server system, a user device, and/or combination of devices local and/or remote from a user. Systems and processes in accordance with many embodiments of the invention employ a file format that includes basic shapes that animate individual action units of a face, along with corrective shapes that are used to correct the animations of action unit combinations.

Computing Morph Target Weights for a 3D Model

Figure 1:
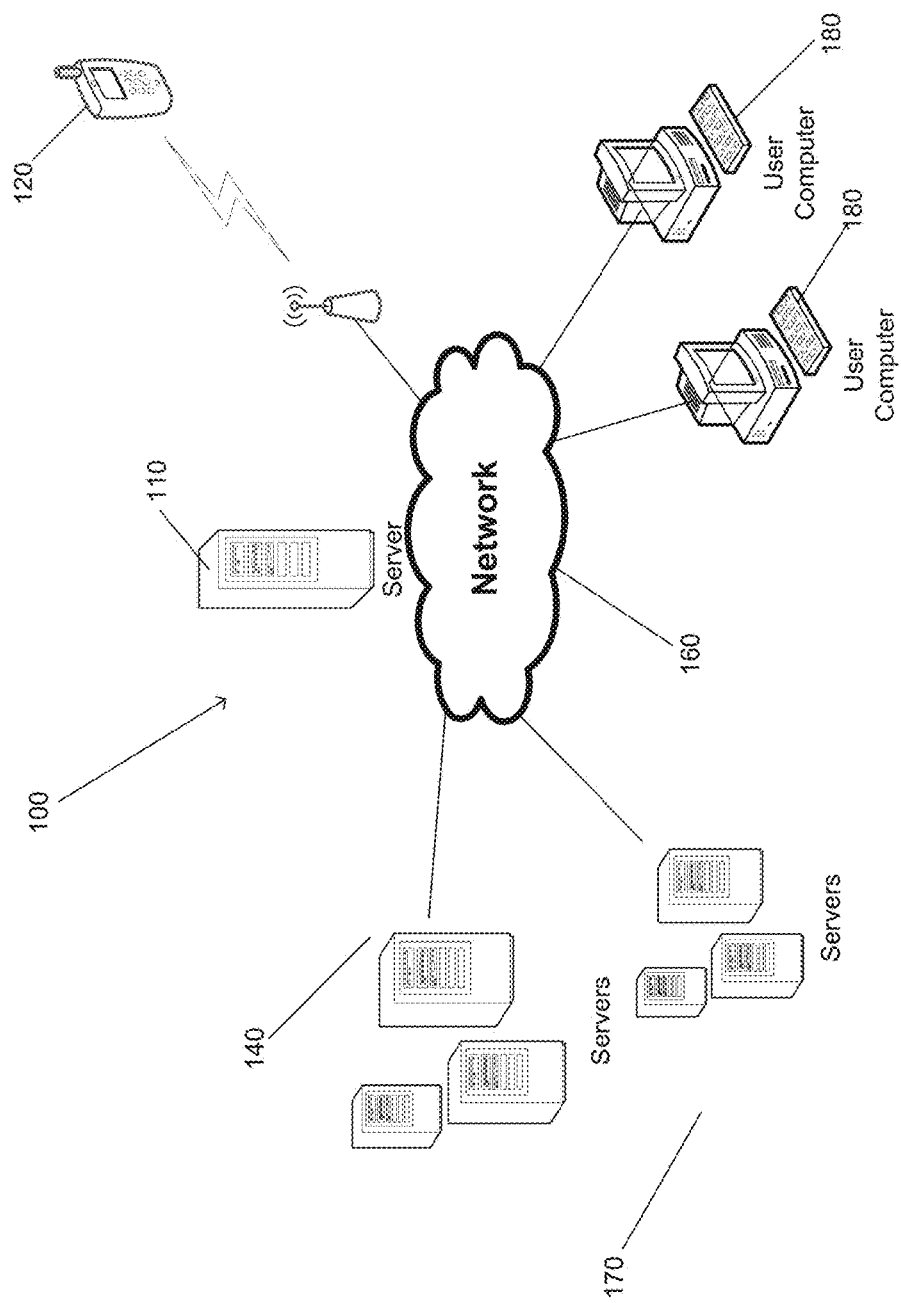
FIG. 1 illustrates a system for performing one or more processes to animate facial expressions for a 3D model of a head in accordance with various embodiments of the invention.

A system that provides animation of a 3D model of a head from received images in accordance with some embodiments of the invention is shown in FIG. 1. Network 100 includes a communications network 160. The communications network 160 is a network such as the Internet that allows devices connected to the network 160 to communicate with other connected devices. Server systems 110, 140, and 170 are connected to the network 160. Each of the server systems 110, 140, and 170 is a group of one or more servers communicatively connected to one another via networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having three servers in the internal network. However, the server systems 110, 140 and 170 may include any number of servers and any additional number of server systems may be connected to the network 160 to provide cloud services. In accordance with various embodiments of this invention, processes for animating expressions for a 3D model based upon facial expressions captured in images are provided by executing one or more processes on a single server system and/or a group of server systems communicating over network 160.

Users may use personal devices 180 and 120 that connect to the network 160 to perform processes for capturing images (or video) of a user, identifying landmarks, and animating expressions for a 3D model in accordance with various embodiments of the invention. In the illustrated embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" and/or "wireless" connection. The mobile device 120 connects to network 160 using a wireless connection. A wireless connection is a connection that uses Radio Frequency (RF) signals, Infrared signals, or any other form of wireless signaling to connect to the network 160. In FIG. 1, the mobile device 120 is a mobile telephone. However, mobile device 120 may be a mobile phone, Personal Digital Assistant (PDA), a tablet, a smartphone, or any other type of device that connects to network 160 via a wireless connection without departing from this invention. In accordance with some embodiments of the invention, processes for animating expressions of a 3D model based upon facial expressions captured in images are performed by the user device. In many embodiments, an application being executed by the user device may capture or obtain images including a face image and transmit the captured images to a server system that performs additional processing based upon the received images. Although references are made to images throughout this application, one skilled in the art will recognize that processes described in this application can clearly be applied to video (or video frames) without departing from this invention.

Figure 2:
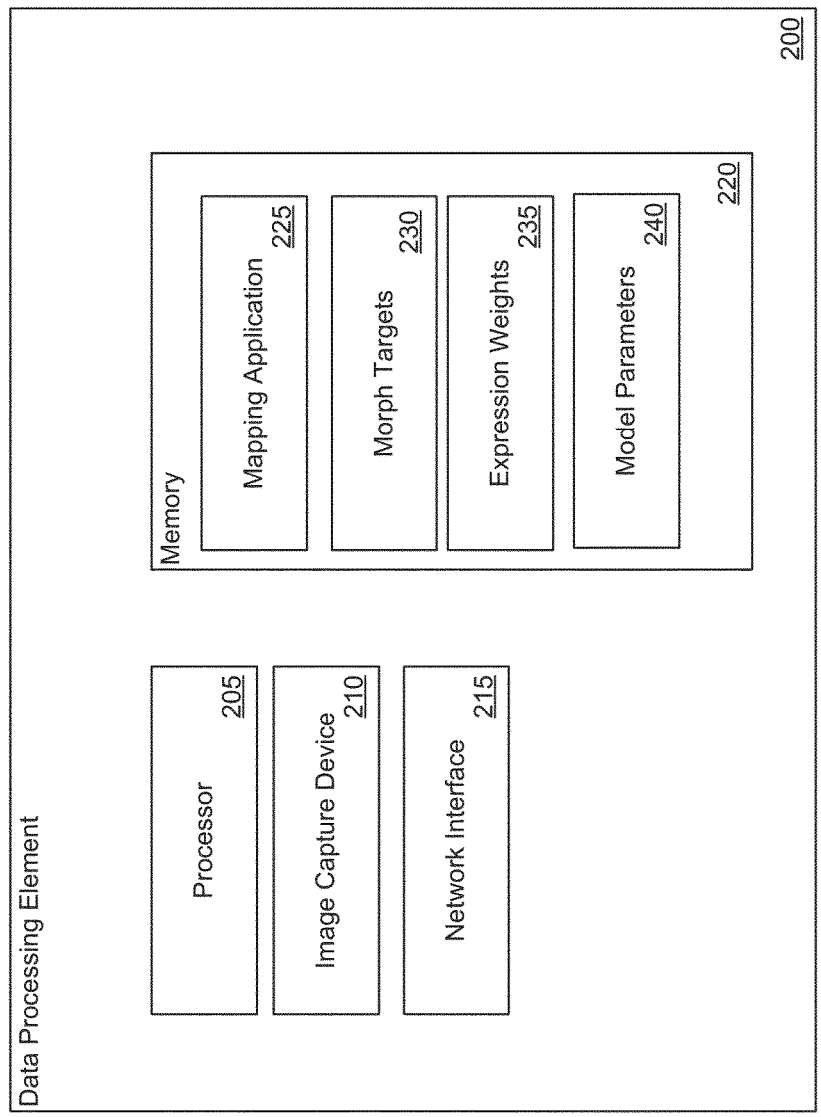
FIG. 2 illustrates components of a data processing element that executes processes to animate facial expressions for a 3D model of a head in accordance with various embodiments of the invention.

Various components of a data processing element that executes one or more processes to provide an animated 3D model of a head in accordance with various embodiments of the invention are illustrated in FIG. 2. Data processing element 200 includes processor 205, image capture device 210, network interface 215, and memory 220. One skilled in the art will recognize that a particular data processing element may include other components that are omitted for brevity without departing from this invention. The processor 205 can include (but is not limited to) a processor, microprocessor, controller, or a combination of processors, microprocessor, and/or controllers that performs instructions stored in the memory 220 to manipulate data stored in the memory. Processor instructions can configure the processor 205 to perform processes in accordance with certain embodiments of the invention. Image capture device 215 can capture and/or retrieve images for the data processing element. Image capture devices can include (but are not limited to) cameras and other sensors that can capture image data of a scene. Network interface 215 allows data processing element 200 to transmit and receive data over a network based upon the instructions performed by processor 205.

Memory 220 includes a mapping application 225, morph targets 230, expression weights 235, and model parameters 240. Mapping applications in accordance with several embodiments of the invention are used to animate expressions for 3D models using model parameters and/or weights that are calculated for morph targets of a 3D model. In some embodiments, the morph targets of a 3D model include a set of base shapes and a set of corrective shapes. Base shapes in accordance with several embodiments of the invention include linear base shapes that represent various action units for a facial model, such as those defined by the facial action coding system (FACS). Corrective shapes in accordance with certain embodiments of the invention are a non-linear function of two or more base shapes used to represent a combined state of multiple action units. In some embodiments, the non-linear function is specified by a corrective interpolator function. Corrective shapes in accordance with several embodiments of the invention are used to correct for rendering errors that can occur when a combination of different base shapes are animated together. In some embodiments, corrective shapes are used to smooth the animation of certain combinations of action units that may result in unnatural looking animations when the animations of the individual base shapes are interpolated.

Although a specific example of a processing system 200 is illustrated in FIG. 2, any of a variety of processing systems can be utilized to perform processes similar to those described herein as appropriate to the requirements of specific applications in accordance with embodiments of the invention.

Figure 3:
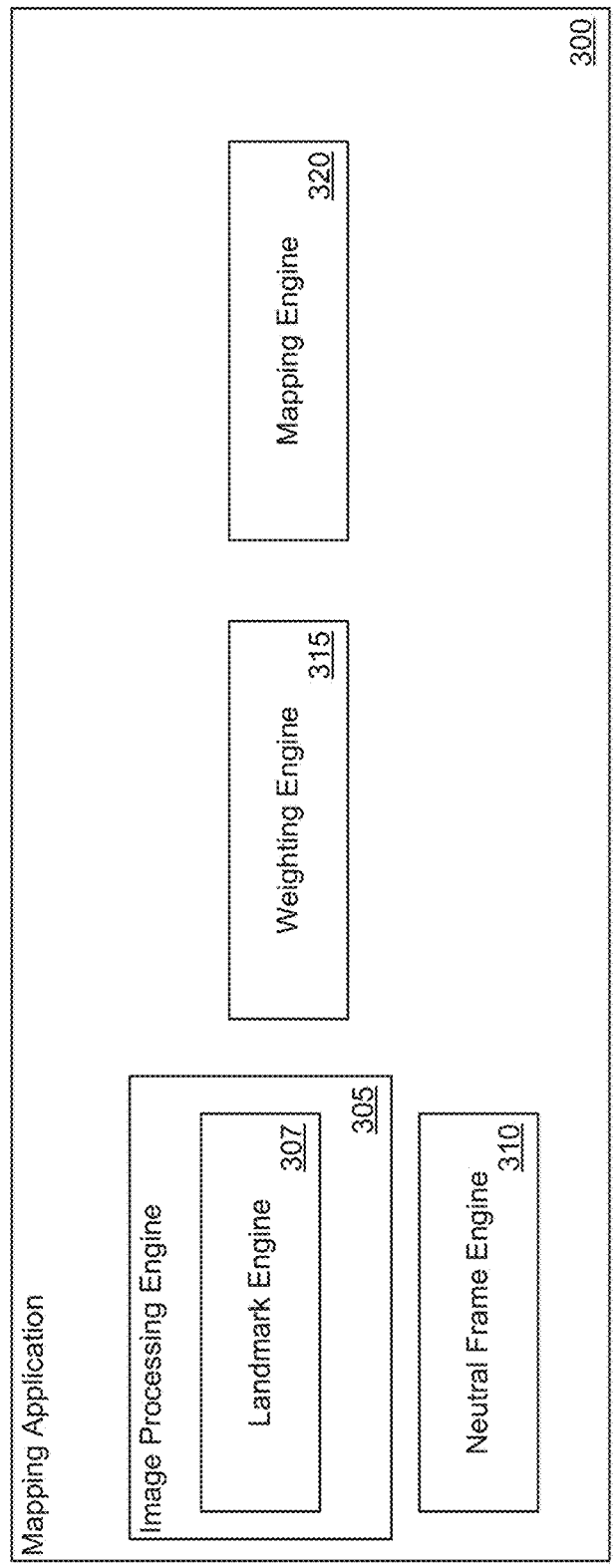
FIG. 3 illustrates components of a mapping application that executes to map facial expressions captured in images to a 3D model of a head in accordance with an embodiment of the invention.

Components of a mapping application that executes to map images of a user to 3D head movements of a 3D model in accordance with an embodiment of the invention are illustrated in FIG. 3. Mapping application 300 includes image processing engine 305, neutral frame engine 310, weighting engine 315, and mapping engine 320.

Image processing engines in accordance with many embodiments of the invention process images captured by an image capture device to perform a variety of functions, including (but not limited to) landmark identification, camera parameter identification, and image preprocessing. In this example, image processing engine 305 includes landmark engine 307, which can be used to detect and track landmarks from captured images. The motion of one or more landmarks and/or 3D shapes in visible video can be tracked, and the expressions of the 3D model video can be recomputed based on the tracked landmarks.

Facial landmarks in accordance with a number of embodiments of the invention can include various facial features, including (but not limited to) eye corners, mouth corners, noses, chins, etc. Methods that can be used for detecting facial landmarks in accordance with several embodiments of the invention include (but are not limited to) a Mnemonic Descent Method (MDM) deep learning approach and a standard ensemble of regression trees (ERT) approach. The MDM deep learning approach is described in U.S. Pat. No. 9,786,084, entitled "Systems and Methods for Generating Computer Ready Animation Models of a Human Head from Captured Data Images", issued Oct. 10, 2017, the disclosure of which is incorporated by reference herein in its entirety.

In certain embodiments, image processing engines analyze images to identify parameters of the camera used to capture the images. Image processing engines in accordance with some embodiments of the invention include 3D image processing engines that infer 3D camera parameters from images of faces, such as (but not limited to) video. Camera parameters in accordance with several embodiments of the invention include (but are not limited to) rotation, tilt, and focal length. In some embodiments, camera parameters can be used for several processes including (but not limited to) adjusting identified landmark positions, classifying facial expressions, as well as animating head and/or neck motions. For example, in some embodiments, the inverse of a camera's motion is applied to animate an avatar's neck and head joints. Animating head and/or neck motions can allow for head motions of an avatar to match with movements of a user. Focal lengths can be used to stabilize an avatar's movement, relative to a camera, as the user moves the camera closer and farther away from the user's face.

The neutral frame engine 310 in accordance with many embodiments of the invention internally manages a neutral frame estimate (in 3D) that approximates the shape of the user's face in a neutral expression. In some embodiments, neutral models of a user's face are used to define a neutral state, where other facial expressions can be measured against the neutral state to classify the other facial expressions. Neutral frame engines in accordance with some embodiments of the invention can use any of a number of approaches to classify a neutral expression, including (but not limited to) using an identity solver from 2D and/or 3D landmarks, using statistics based on ratios of 3D face distances, and maintaining an adaptive neutral geometry in 3D by temporally accumulating data across multiple frames.

Figure 4:
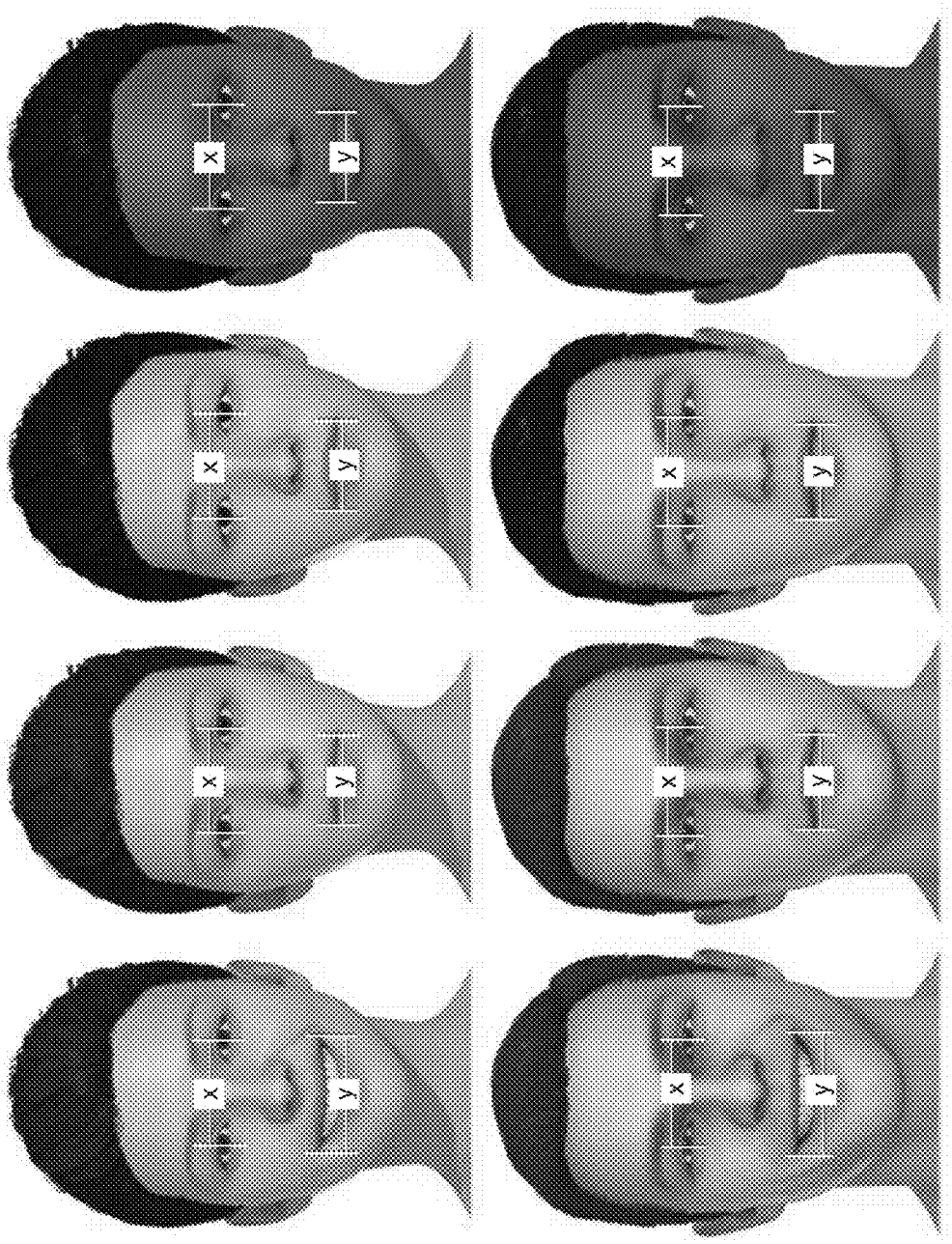
FIG. 4 illustrates examples of different facial ratios used for estimating neutral expressions.

Examples of different facial ratios used for estimating neutral expressions are illustrated in FIG. 4. In this example, 3D distances are measured between the centers of each person's eyes (illustrated with an x) and the distance between the outer corners of the mouth (illustrated with a y). For faces in a neutral pose, the ratio of y/x has been measured with a Gaussian distribution with a mean of 0.8 and standard deviation of 0.15 across different genders and ethnicities. That ratio can be much higher or lower when a user is not in a neutral expression. In this example, the smiling face illustrated in the first face of each row has a y/x ration that is much higher than 1.0. In many embodiments, several such ratios of distances between facial features can be used to compute an overall neutral face distribution. Neutral face distributions can be used in accordance with several embodiments of the invention for a variety of uses including, but not limited to, estimating a neutral frame, updating an existing neutral frame, and/or classifying a user's current expression. For example, in some embodiments, a user's current expression is adjusted with ratios from a neutral face distribution to estimate the user's neutral frame.

In some embodiments, weighting engines can be used to determine weights for different morph targets of a 3D model. Weighting engines in accordance with a number of embodiments calculate the weights based on results from image processing engines and/or neutral frame engines. Weights for the different morph targets are used to animate different facial expressions on a 3D model. A weighting engine in accordance with an embodiment of the invention is described in greater detail below with reference to FIG. 5.

Mapping engines in accordance with a number of embodiments of the invention can animate expressions of a 3D model by morphing between the morph targets of a 3D model based on the weights calculated by weighting engines. In some embodiments, the morphing is a linear combination of the morph targets with their corresponding weights.

Figure 5:
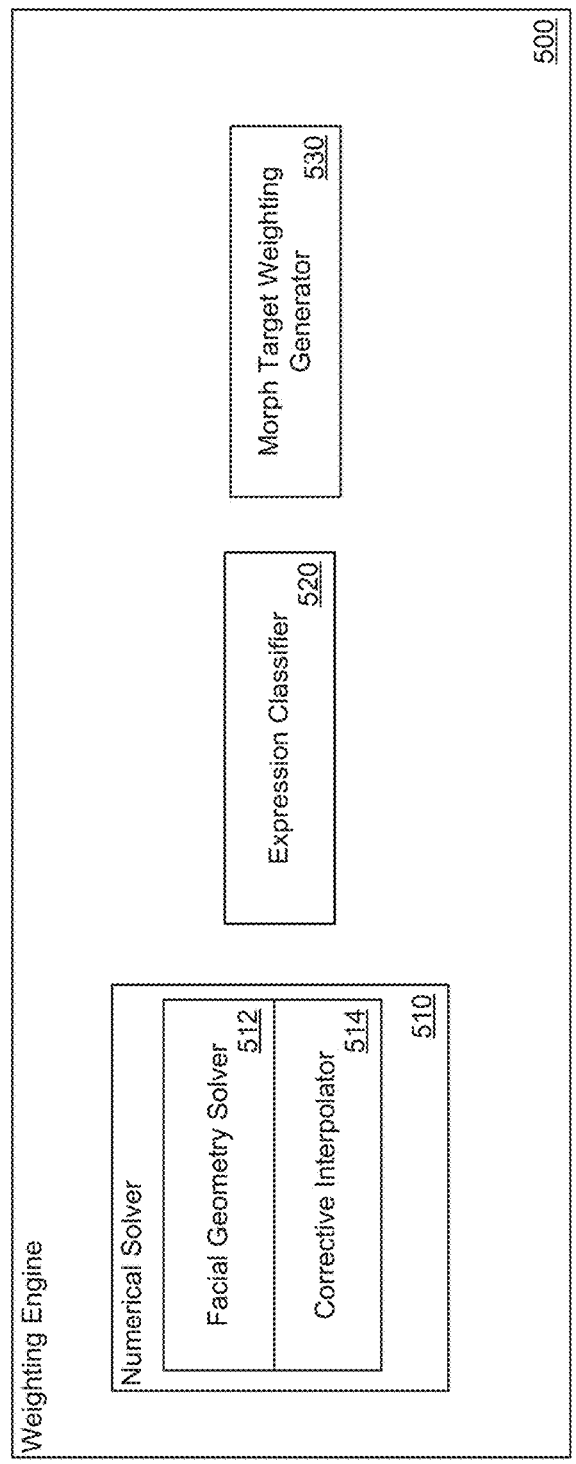
FIG. 5 illustrates a weighting engine that executes to solve for weights of morph targets of a 3D model of a head in accordance with an embodiment of the invention.

A weighting engine that executes to solve for weights of morph targets of a 3D model of a head in accordance with an embodiment of the invention is illustrated in FIG. 5. Weighting engines in accordance with several embodiments of the invention are used to determine weights for different morph targets of a 3D model. Weighting engine 500 includes a numerical solver 510, expression classifier 520, and morph target weighting generator 530.

Numerical solvers, or optimizers, in accordance with many embodiments of the invention can receive an array of 2D facial landmarks to set up a numerical optimization problem that can solve for the facial geometry and animation weights on facial morph targets. In accordance with many embodiments, the Facial Action Coding System (FACS) morph targets may be constructed by an artist using 3D modelling tools. In several embodiments, the FACS blend shapes may be synthesized using muscle-based physical simulation systems.

In the example of FIG. 5, numerical solver 510 includes facial geometry solver 512 and corrective interpolator 514. Facial geometry solvers can use identified landmarks to determine the facial geometry of a user and to determine their relative positions in order to identify weights for morph targets. In many embodiments, numerical solvers operate in a multi-stage operation that uses landmarks from images to first identify a neutral frame (or an identity-basis) for a user and to then calculate a differential for subsequent images based on the neutral frame to classify expressions from the user's face. In several embodiments, numerical solvers use a neutral state shape in the optimization and update the neural state shape as the system sees more images of the users face in a video sequence. Neutral shapes can be used in conjunction with subsequent images of a user's face to more accurately classify a user's expression.

Correctives are often useful for correcting certain rendering errors that can arise when multiple action units are activated together. Corrective interpolators in accordance with several embodiments of the invention are used to calculate weights to interpolate between various combinations of base shapes.

In accordance with many of these embodiments, numerical solvers can solve for camera parameters. The camera parameters may include, but are not limited to, camera rotation, camera translation, Field of View (FOV), and focal length. In some embodiments, camera parameters are stored in metadata associated with images or in a memory of the device.

Figure 6:
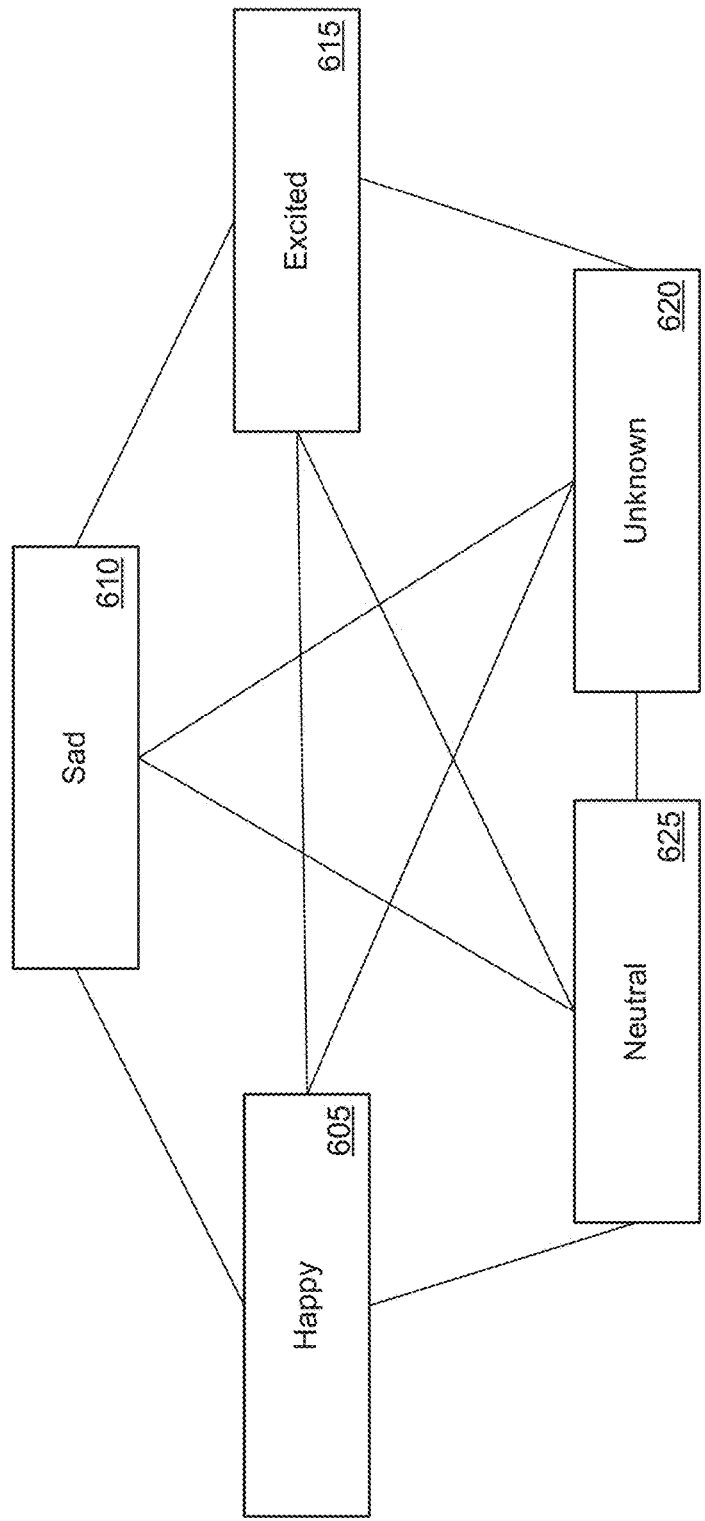
FIG. 6 is a conceptual diagram of an expression state machine for classifying expressions of a user from captured images of the user in accordance with an embodiment of the invention.

In several embodiments, solved facial geometries and/or morph target weights from a numerical solver are used by expression classifiers to classify the facial geometry into an expression state. In some embodiments, this is implemented with an expression state machine. A conceptual diagram of an expression state machine for classifying expressions of a user from captured images of the user in accordance with an embodiment of the invention is illustrated in FIG. 6. Expression states in accordance with some embodiments of the invention include the universal expressions (happy, sad, angry, etc). In certain embodiments, expression states include two special expression states: "neutral" and "unknown", which can be very helpful in capturing the facial state when a person is talking without a strong facial expression, or when the user is making a face that cannot be classified into a traditional expression. The expression classification can be achieved by analyzing the morph target weights directly, or in combination with image and landmark inputs using machine learning techniques.

Once an expression has been classified, morph target weighting generators in accordance with many embodiments of the invention identify predefined weights for the classified expression. In some embodiments, morph target weighting generators use a combination of the predefined weights and the weights calculated by the numerical solver to determine a final set of weights for the morph targets. By classifying a user's expression and using predefined weights for various emotions, expressions of different 3D models (or avatars) can be standardized, allowing a designer to create morph targets of a model based on predictable weightings for various expressions, such as (but not limited to) a happy face, a surprised face, a sad face, etc. Each expression may include multiple weights for various different morph targets in a 3D model. In certain embodiments, when the expression is unknown, the weights calculated by the numerical solver are used as the final set of weights for the morph targets.

Figure 7:
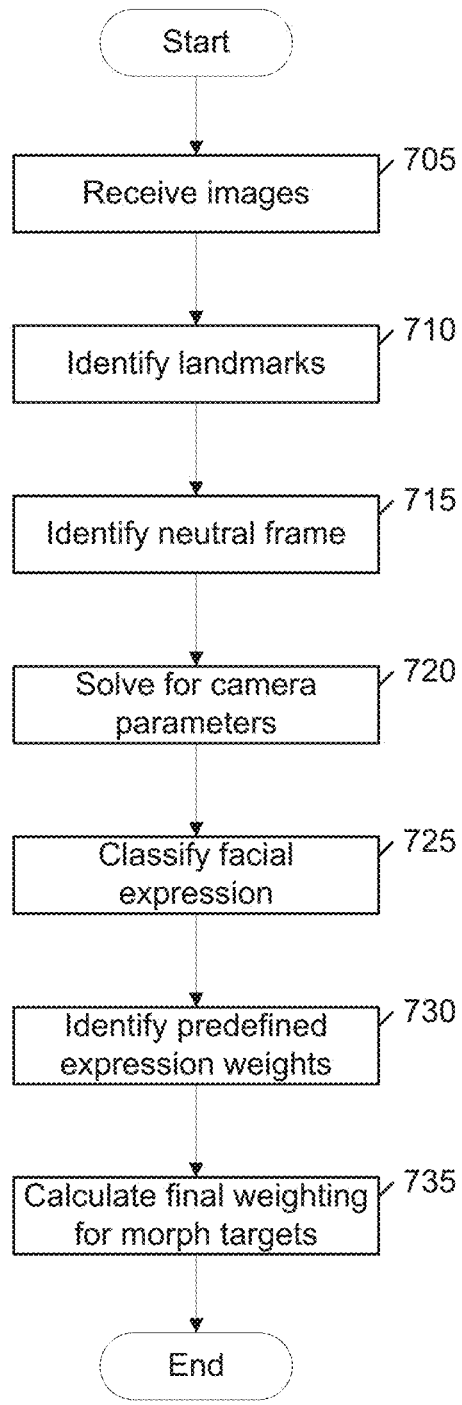
FIG. 7 illustrates a flow diagram of a process for calculating weights for morph targets in accordance with an embodiment of the invention.

A process for calculating a final set of weights for morph targets in accordance with an embodiment of the invention is illustrated in FIG. 7. Process 700 receives (705) images of a user's face. In certain embodiments, images of a user are captured with an image capture device (e.g., a camera) of the user's device. In accordance with several of these embodiments, an application executed by the user device controls the image capture device to capture the image data. In accordance with some embodiments, images are read from memory. In accordance with some other embodiments, images can be received from another device via a communication network. Optionally, image capture information such as depth information, focal length and/or other camera information may be received along with a captured image. In several embodiments, the make and/or model of the image capture device is received and used to look-up camera parameters stored in a table or other data structure in memory.

In many embodiments, the image is a 3D image capturing an image of a human face. Images in accordance with some embodiments of the invention include depth measurements obtained from a depth sensor including (but not limited to) a time of flight camera and/or a structured light camera. In a number of embodiments, the images include images captured by multiple imagers captured using a plenoptic camera and/or images captured using a coded aperture from which depth information concerning distances to objects within a scene may be determined.

Process 700 identifies (710) landmarks from the received images. The identification of certain features or landmarks of a face can be useful in a variety of applications including (but not limited to) face detection, face recognition, and computer animation. In many embodiments, the identification of landmarks includes the identification of 3D points of a user's face, which may aid in animation and/or modification of a face in a 3D model. In accordance with some embodiments of an invention, a Mnemonic Descent Method (MDM) is used for facial landmark tracking. The goal of tracking the facial landmarks is to predict a set of points on an image of a face that locate salient features (such as eyes, lip corners, jawline, etc.).

Process 700 identifies (715) a neutral frame from the received images. Neutral frames in accordance with several embodiments of the invention represent the positions of facial landmarks when the user's facial expression is in a neutral state. In many embodiments, identifying a neutral frame is an iterative process that refines the identified neutral state as more information about the user's face is gathered. In certain embodiments, the neutral frame is solved (and updated) in 3D from multiple image and/or video measurements. An example of a process for identifying a neutral frame in accordance with an embodiment of the invention is described below with reference to FIG. 10.

Process 700 solves (720) for camera parameters. Camera parameters in accordance with a number of embodiments of the invention include (but are not limited to) focal length, rotation, and tilt. In some embodiments, camera parameters are used for a variety of reasons, including (but not limited to) identifying landmarks, building/maintaining a neutral frame, and adjusting the calculated weights for morph targets.

Process 700 classifies (725) the landmarks as a facial expression. Classifying the landmarks in accordance with many embodiments of the invention include classifying the landmarks as an indication of a particular emotion, such as (but not limited to) happiness, sadness, surprise, and anger. In several embodiments, classification is performed based on differentials calculated based on differentials between a user's neutral frame and the landmarks from a current image of the user's face. Classification as emotions and/or other facial expressions can be performed using a variety of machine learning techniques, including, but not limited to, convolutional neural networks, support vector machines, and decision trees. In several embodiments, expressions can be obtained by classifying 3D morph target weights produced by a numerical solver.

Process 700 identifies (730) predefined expression weights for the classified expression. In some embodiments, predefined expression weights include weights for multiple morph targets that are weighted to be animated together. In the case that the expression is Unknown, processes in a variety of embodiments do not identify any additional predefined weights, but allow the weights to be calculated based on the identified landmarks.

Process 700 calculates (735) a final set of weights for the morph targets to animate a 3D model. Final sets of weights in accordance with a number of embodiments of the invention are calculated based on one or more of the predefined expression weights and the calculated landmark positions. The final weight in accordance with several embodiments of the invention can be computed via a non-linear blend function that combines the predefined weights (on a subset of the morph target shapes) with the solved weights from the numerical solver. In some embodiments, a user's expression is matched closely with the captured images, but is adjusted based on predefined weights for classified expressions. The strength of the user's expression and the predefined weights can be adjusted in accordance with certain embodiments of the invention.

In some embodiments, function curves are used to control the rate of blending weights to morph between different expressions. Function curves in accordance with a number of embodiments of the invention can be used to ensure smooth blending of the morph target weights between detected expressions. In certain embodiments, it can be desirable to provide a fast ramp in of a current detected expression, and a fast blend out of the previous expression (or neutral). In many embodiments, a function curve used for blending into an expression can be different from a function curve for blending out of an expression, providing different rates of change for smoother and more natural transitions.

Figure 8:
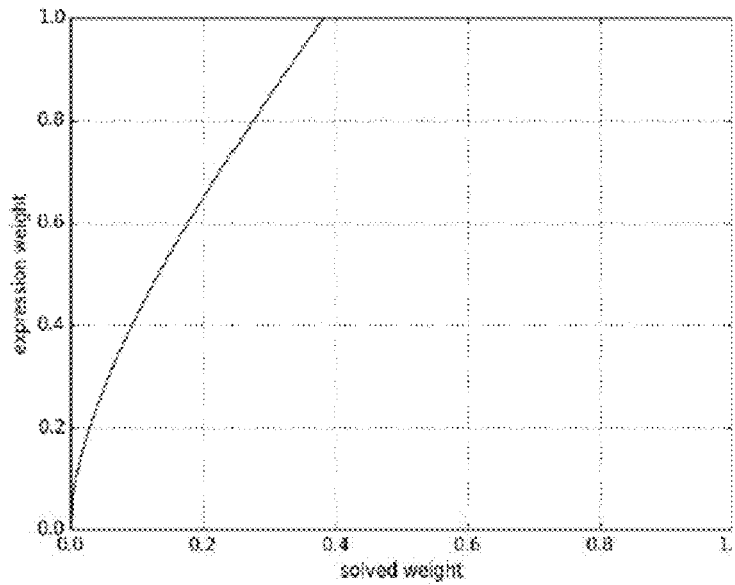
FIG. 8 illustrates an example function curve for ramping into an expression.
Figure 9:
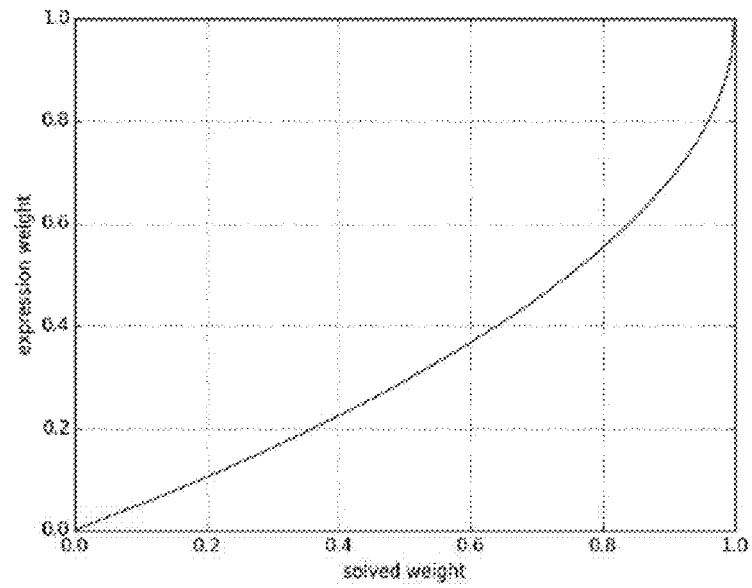
FIG. 9 illustrates an example function curve for blending out of a detected expression.

Example function curves for expression blending are illustrated in FIGS. 8-9. In FIG. 8, an example function curve for ramping into an expression is illustrated. The function curve of this figure is used to modify a morph target corresponding to a "detected" expression, allowing the morph target weight to ramp up very quickly to a full expression (at 1.0). The morph target weight then remains at 1.0, as the solved weight increases past the threshold (set to 0.4 in this example).

Any curves that are not part of a detected expression can be blended out according to a different function curve. FIG. 9 illustrates a function curve for blending out of a detected expression. In this example, the expression weight of a single morph target (i.e., the expression that is being blending out) accelerates down as the solved weight reduces from 1 to 0.

Although processes for calculating morph weights in accordance with the illustrated embodiment is described above, other processes for calculating morph weights in accordance with other embodiments of the invention may be used depending on the requirements of the particular system implemented.

Computing Neutral Frames

The framework in accordance with a number of embodiments of the invention builds an internal 3D representation of the users face in neutral expression (or neutral frame) by combining facial landmarks across multiple frames of video. In several embodiments, neutral frames are computed by a numerical solver and are continually updated over time with additional frames of video. Neutral frames in accordance with many embodiments of the invention are estimated in multiple stages: at the very first frame of video, and subsequently by accumulating multiple frames that are classified as "neutral" by the expression classifier.

Figure 10:
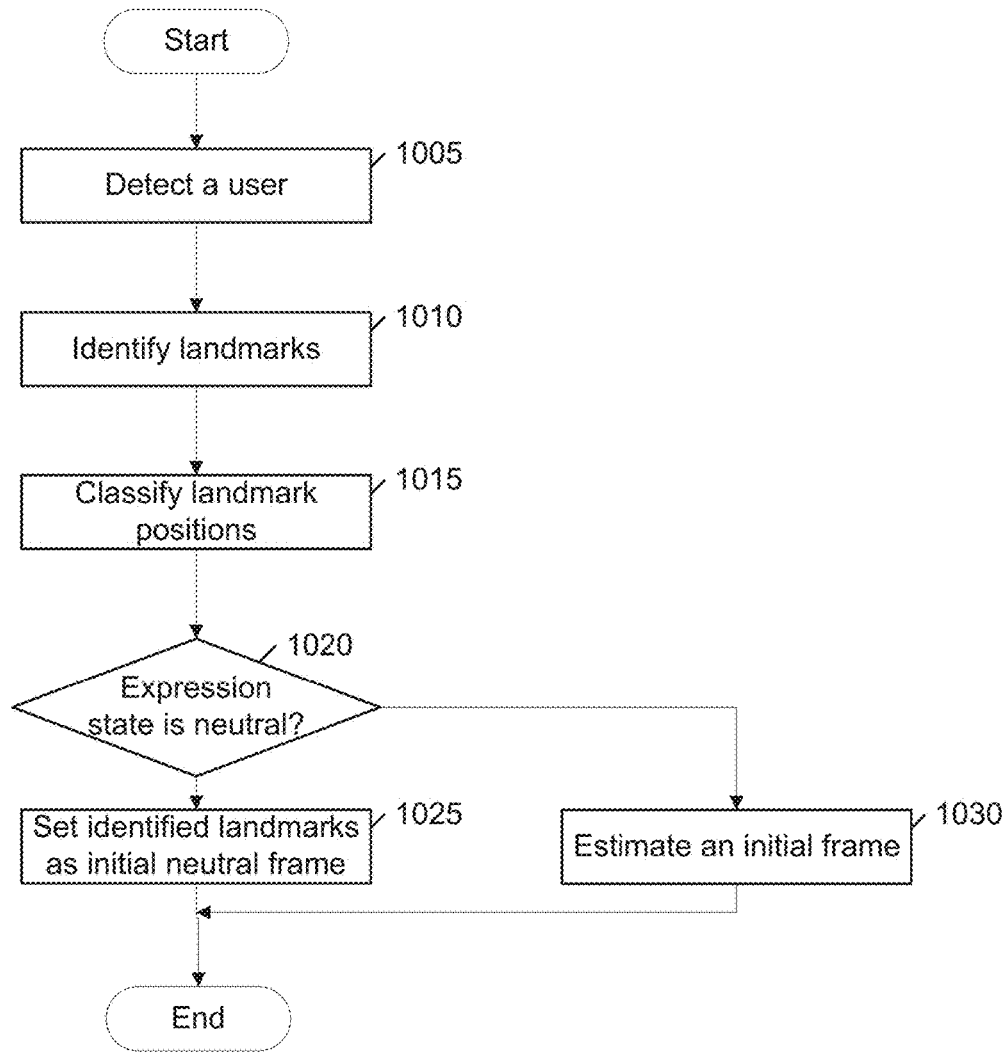
FIG. 10 illustrates a flow diagram of a process for identifying an initial neutral frame for a user in accordance with an embodiment of the invention.

An example of a process for identifying an initial neutral frame for a user in accordance with an embodiment of the invention is described below with reference to FIG. 10. In order to identify a neutral frame, process 1000 detects (1005) a user and identifies (1010) landmarks of an initial set of images of the user. In several embodiments, the identified facial landmarks from images of a user's face are fitted to a 3D template based on a distribution of the 3D points. 3D templates in accordance with a number of embodiments of the invention can be generated based on landmarks identified from neutral expressions of several different people, allowing the template to accommodate a broader range of landmark distributions.

Process 1000 classifies (1015) the constellation of landmark positions to identify an expression state (e.g., smiling, sad, neutral, etc.) based on the identified landmarks. In some embodiments, classification of the constellation of landmark positions is performed using one or more machine learning techniques, including (but not limited to) convolutional neural networks, support vector machines, and decision trees. Classifying the landmark positions in accordance with some embodiments of the invention are performed using a heuristics based approach that classifies an expression as neutral based on the distribution of the landmark positions. For example, a variety of factors including (but not limited to) mouth widths, eye shapes, and mouth shapes can be used to predict whether a person is performing a variety of different non-neutral expressions including, but not limited to, smiling, winking, frowning, etc.

When process 1000 determines (1020) that the expression state is neutral, the process sets (1025) the identified landmarks of the initial image set as the initial neutral frame. When process 1000 determines (1020) that the expression state is not neutral, the process attempts to estimate (1030) an initial frame. Estimating an initial frame can include (but is not limited) various methods including factorizing out identified expressions and initializing the neutral frame to a base template that is not customized to any specific user. Factorizing out an identified expression in accordance with a number of embodiments of the invention can include modifying the positions of the identified landmarks based on the determined expression state. For example, in certain embodiments, if a user is determined to be smiling from an initial set of images, neutral frames can be calculated to adjust landmark positions of the neutral frame by reversing the expected changes of a smile from a neutral position based on neutral frames from other models. In a number of embodiments, when no expression state can be identified, a base template can be used as an initial neutral frame until enough images are gathered to generate a better neutral frame for the user. Once the initial neutral frame is set, process 1000 ends. In many embodiments, neutral frames are continuously updated as more images of a user are captured in order to reach a better neutral frame.

Dynamically updated neutral frames can make facial expression tracking significantly robust to several real-world scenarios, where a user's face may go out of frame and returns back into the field of view of the camera, or where the view may switch to a different user's face. User changes can occur because a different user comes into the view of the camera, or because a current user turns their head away from the camera and subsequently comes back into the view. In such cases, it can be important to detect if the user has changed, or whether it is the same user that was previously in view, in order to determine whether to reset the neutral frame for a new user, or to update the existing neutral frame for the same user.

Figure 11:
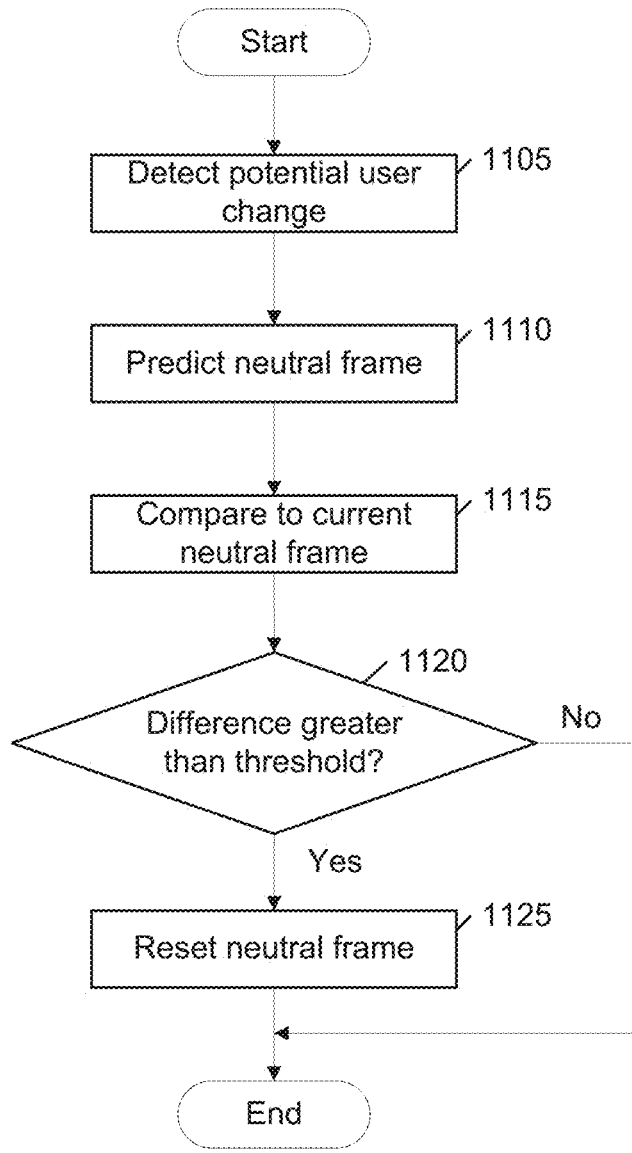
FIG. 11 illustrates a flow diagram of a process for updating a neutral frame in accordance with an embodiment of the invention.

A process for updating a neutral frame in accordance with an embodiment of the invention is illustrated in FIG. 11. Process 1100 detects (1105) a potential user change. In several embodiments, potential user changes can be detected when a user's face can no longer be detected in an image. In certain embodiments, potential user changes can be detected based on sudden or large movements of the image capture device. Such movements can be detected based on sensors, such as (but not limited to) accelerometers, or through analysis of the captured images.

Process 1100 predicts (1110) a new neutral frame based on images captured after the detected potential user change. Process 1100 then compares (1115) the new neutral frame to a prior neutral frame that was calculated prior to the detected potential user change. Process 1100 then determines (1120) whether the difference between the new neutral frame and the prior neutral frame exceeds a particular threshold. When the difference between the new neutral frame and the prior neutral frame exceeds the threshold, the process resets (1125) the neutral frame based on the newly predicted neutral frame. In some embodiments, prior neutral frames are discarded or stored for the case that the original user returns into view. When the difference does not exceed the threshold, or after the neutral frame is reset (1125), process 1100 ends.

Although a process for updating a neutral frame in accordance with the illustrated embodiment is described above, other processes in accordance with other embodiments of the invention may be used depending on the requirements of the particular system implemented.

Model File Format

Figure 12:
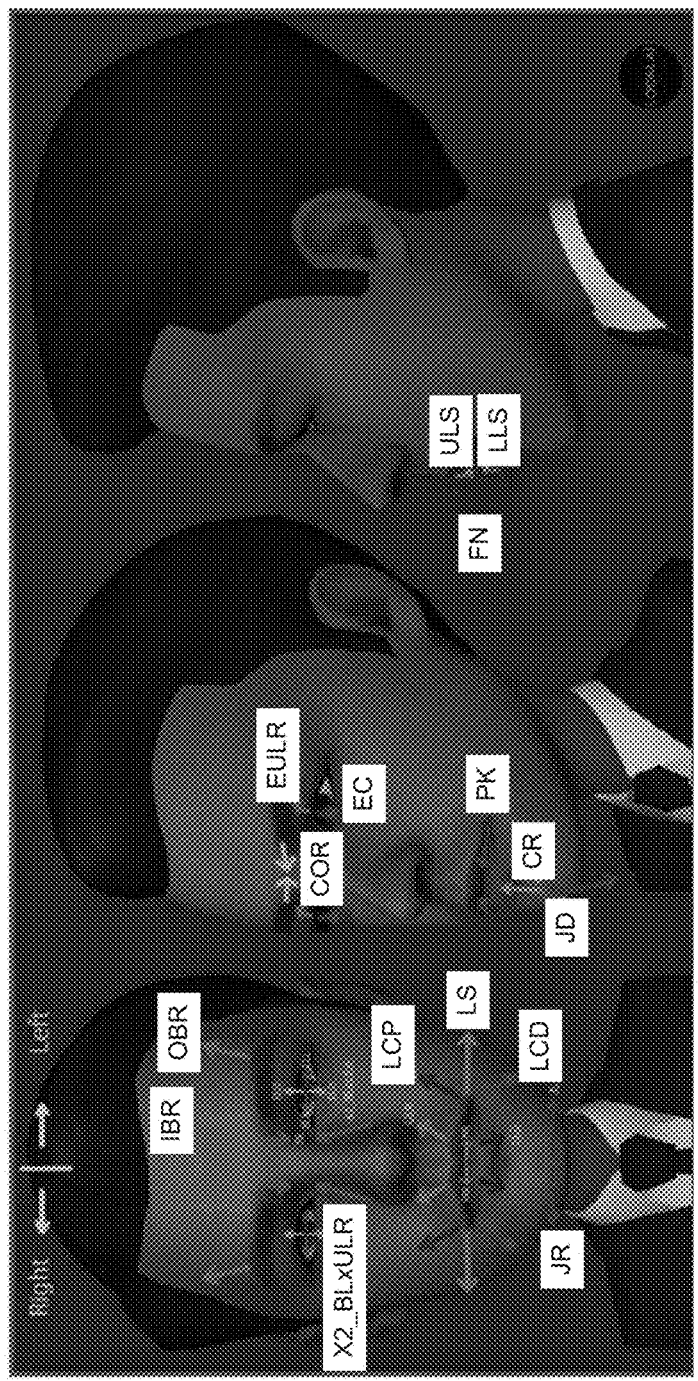
FIG. 12 illustrates action units of the facial action coding system (FACS).

Mapper frameworks in accordance with several embodiments of the invention are designed to provide maximum flexibility in the characters that are driven by a user's face. In some embodiments, the facial movements of a person's face can be coded based on the facial action coding system (FACS). Action units of FACS are illustrated in FIG. 12. Action units identify a set of basic facial movements that a face can make. The action units can be combined to build expressions. Morph targets in accordance with many embodiments of the invention include base shapes that represent the movements of the individual action units as well as corrective shapes that represent the movements of two or more action units. In the sample of FIG. 12, arrows indicate the direction and magnitude of various action units.

In some embodiments, morph targets (including base shapes and corrective shapes) are stored in a standardized model file format. In certain embodiments, the facial rig is embedded using a modified version of the GL transmission format (gITF), a specification for 3D models. The table below shows an example of a modified gITF specification with 75 morph targets, including 43 base shapes and 32 corrective shapes.

TABLE 1

| Index | Identifier | Description |
|---|---|---|
| 0 | c_BL | Brow Lowerer: Lower the eyebrows down |
| 1 | c_COR | Corrugator: Brings the left and right brows inward together |
| 2 | c_CR | Chin Raiser: Raise the chin up moving the lower lip upwards |
| 3 | c_EC | Eyes Closed: Closes the eyelids |
| 4 | c_ELD | Eyes Look Down: Gaze down |
| 5 | c_ELL | Eyes Look Left: Gaze left |
| 6 | c_ELR | Eyes Look Right: Gaze right |
| 7 | c_ELU | Eyes Look up: Gaze up |
| 8 | c_EULR | Eye Upper Lid Raiser: Raises the eyelids upwards to reveal more of the eye white above the iris |
| 9 | c_FN | Funneler: Makes a 'O' shape with the mouth |
| 10 | c_IBR | Inner Brow Raiser: Raises the interior part of the brows upwards |
| 11 | c_JD | Jaw Drop: Lowers the jaw downward opening the mouth |
| 12 | c_JL | Jaw Left: Moves mouth and jaw to the left (character left) |
| 13 | c_JR | Jaw Right: Moves mouth and jaw to the right (character right) |
| 14 | c_LCD | Lip Corner Down: Lowers the corners of the mouth downwards in a frown |
| 15 | c_LCP | Lip Corner Puller: Raises the corners of the mouth upwards in a smile, and squints the eyes |
| 16 | c_LLD | Lower Lip Depressor: Lowers the lower lip down away from the upper lip revealing the lower teeth |
| 17 | c_LLS | Lower Lip Suck: Rolls the lower lip up over the teeth |
| 18 | c_LP | Lip Presser: Presses the lips together |
| 19 | c_LPT | Lips Together: Brings the lips together relative to c_JD |
| 20 | c_LS | Lip Stretcher: Stretches the corners of the mouth apart. |
| 21 | c_ML | Mouth Left: Moves the mouth left |
| 22 | c_MR | Mouth Right: Moves the mouth right |
| 23 | c_OBR | Outer Brow Raiser: Raises the outer part of the brows upwards |
| 24 | c_PK | Pucker: Makes a kiss like shape with the mouth |
| 25 | c_ULR | Upper Lip Raiser: Raises the upper lip away from the lower lip revealing the upper teeth |
| 26 | c_ULS | Upper Lip Suck: Rolls the Upper lip around the teeth. |
| 27 | l_BL | Left Brow Lowerer: Lower the left brow down |
| 28 | l_EC | Left Eye Closed: Closes the left eyelid |
| 29 | l_EULR | Left Eye Upper Lid Raiser: Raises the left eyelid upwards to reveal more of the eye white above the iris |
| 30 | l_IBR | Left Inner Brow Raiser: Raises the interior half of the left brow upwards |
| 31 | l_LCD | Left Lip Corner Down: Lowers the corners of the mouth downwards in a frown |
| 32 | l_LCP | Left Lip Corner Puller: Raises the corners of the mouth upwards in a smile |
| 33 | l_LS | Left Lip Stretcher: Stretches the corners of the mouth apart. |
| 34 | l_OBR | Left Outer Brow Raiser: Raises the outer part of the left brow upwards |
| 35 | r_BL | Right Brow Lowerer: Lower the right brow down |
| 36 | r_EC | Right Eye Closed: Closes the right eyelid |
| 37 | r_EULR | Right Eye Upper Lid Raiser: Raises the right eyelid upwards to reveal more of the eye white above the iris |
| 38 | r_IBR | Right Inner Brow Raiser: Raises the interior half of the right brow upwards |
| 39 | r_LCD | Right Lip Corner Down: Lowers the corners of the mouth downwards in a frown |
| 40 | r_LCP | Right Lip Corner Puller: Raises the corners of the mouth upwards in a smile |
| 41 | r_LS | Right Lip Stretcher: Stretches the corners of the mouth apart. |
| 42 | r_OBR | Right Outer Brow Raiser: Raises the outer part of the right brow upwards |
| 43 | x2_c_BLxULR | Corrects the Brow Lowers and the Upper Lip Raises to create a Sneer |
| 44 | x2_c_ECxLCP | Corrects the eyelids from collapsing as smile and eyes close |

TABLE 1-continued

| Index | Identifier | Description |
|---|---|---|
| 45 | x2_c_ELDxELL | Corrects the eyelid shapes when the gaze looks down left |
| 46 | x2_c_ELDxELR | Corrects the eyelid shapes when the gaze looks down right |
| 47 | x2_c_ELLxELU | Corrects the eyelid shapes when the gaze looks up left |
| 48 | x2_c_ELRxELU | Corrects the eyelid shapes when the gaze looks up right |
| 49 | x2_c_FNxJD | Corrects the shape of the mouth when funnel and mouth is open |
| 50 | x2_c_FNxPK | Corrects the shape of the mouth when you pucker and funnel; creating a tighter 'o' shape |
| 51 | x2_c_JDxLLD | Corrects the shape of the lower lip when the lower teeth and mouth are open |
| 52 | x2_c_JDxLLS | Corrects the shape of the lower lip when the lip rolls over the bottom teeth and mouth is open |
| 53 | x2_c_JDxLS | Corrects the shape of the mouth when the corners of the mouth stretch apart and the mouth is open |
| 54 | x2_c_JDxPK | Corrects the pucker when the mouth is open |
| 55 | x2_c_JDxULR | Corrects the upper lip placement as the the jaw drops and the upper teeth are revealed. |
| 56 | x2_c_LCPxLS | Corrects the combination of smile and the corners of the mouth stretched apart to create a wide smile. |
| 57 | x2_c_LCPxPK | Corrects the opposing muscles of pucker and smile creating a smiling pucker. |
| 58 | x2_c_LCPxULR | Corrects the upper lip from going too far up when smile and the upper lip is raised to reveal teeth |
| 59 | x2_c_LSxULR | Corrects the upper lip from going too far up when the corners of the mouth stretch apart and the upper teeth are revealed |
| 60 | x2_l_BLxULR | Corrects the left brow lowers and the upper teeth are revealed to create a sneer |
| 61 | x2_l_ECxLCP | Corrects the eyelids from collapsing as smile and eyes close on the left side of the face |
| 62 | x2_l_JDxLS | Corrects the shape of the mouth when the corners of the mouth stretch apart and the mouth is open on the left side of the face |
| 63 | x2_l_LCPxLS | Corrects the combination of smile and the corners of the mouth stretched apart to create a wide smile on the left side of the face |
| 64 | x2_l_LCPxPK | Corrects the opposing muscles of pucker and smile creating a smiling pucker on the left side of the face |
| 65 | x2_l_LCPxULR | Corrects the upper lip from going too far up when smile and the upper lip is raised to reveal teeth on the left side of the face |
| 66 | x2_l_LSxULR | Corrects the upper lip from going too far up when the corners of the mouth stretch apart and the upper teeth are revealed on the left side of the face |
| 67 | x2_r_BLxULR | Corrects the right brow lowers and the upper teeth are revealed to create a sneer |
| 68 | x2_r_ECxLCP | Corrects the eyelids from collapsing as smile and eyes close on the right side of the face |
| 69 | x2_r_JDxLS | Corrects the shape of the mouth when the corners of the mouth stretch apart and the mouth is open on the right side of the face |
| 70 | x2_r_LCPxLS | Corrects the combination of smile and the corners of the mouth stretched apart to create a wide smile on the right side of the face |
| 71 | x2_r_LCPxPK | Corrects the opposing muscles of pucker and smile creating a smiling pucker on the right side of the face |
| 72 | x2_r_LCPxULR | Corrects the upper lip from going too far up when smile and the upper lip is raised to reveal teeth on the right side of the face |
| 73 | x2_r_LSxULR | Corrects the upper lip from going too far up when the corners of the mouth stretch apart and the upper teeth are revealed on the right side of the face |
| 74 | x3_c_FNxJDxPK | Corrects the shape of the mouth when you pucker and funnel; creating a tighter 'o' shape when the mouth is open |

In some embodiments, morph targets are assigned identifiers based on the associated base shape(s) and/or shape type. Morph target identifiers in accordance with many embodiments of the invention are built according to a set of naming codes. In a number of embodiments, naming codes include affixes (i.e., prefixes and suffixes) to identify various characteristics of each morph target. Affixes for the side of a head, whether or not it is a corrective, a number of base shapes are involved in the corrective, higher level shapes (e.g., head, neck), joints. In the example above, a prefix of "c_" indicates a non-split shape, in which both the left and right sides of the head are combined, while prefixes of "l_" and "r_" indicate a split shape on the left and right sides of the head respectively.

Figure 13:
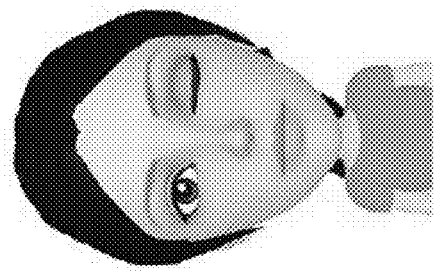
FIGS. 13-18 illustrate the activation of morph targets for basic shapes of a 3D model.
Figure 14:
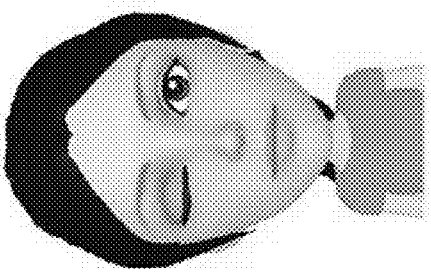

FIGS. 13 and 14 illustrate examples of morph targets, l_EC and r_EC respectively. The l_EC morph target shows the activation of an action unit to close the left (for the character) eye. The r_EC morph target shows the activation of the corresponding action unit for the right eye. Many morph targets have separate, but corresponding actions for the left and right side of the face.

Figure 15:
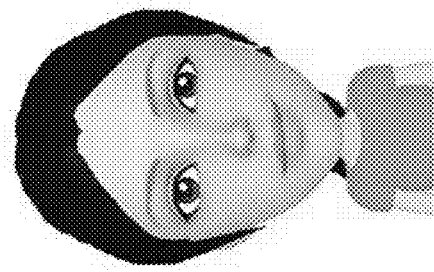
Figure 16:
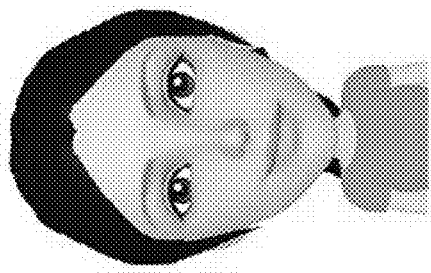

FIGS. 15 and 16 illustrate more examples of morph targets. Some morph targets have a primary effect, but may also have a secondary effect on other parts of the face as well. For example, morph targets l_LCP and r_LCP represent the left and right lip corner pullers respectively, which raise the corners of the left/right side of the mouth upwards in a smile, and squints the eyes.

Figure 17:
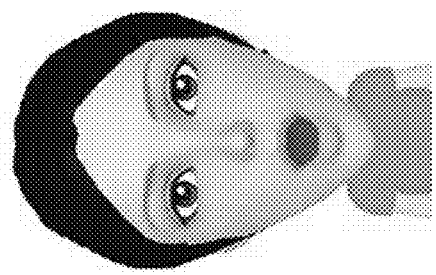
Figure 18:
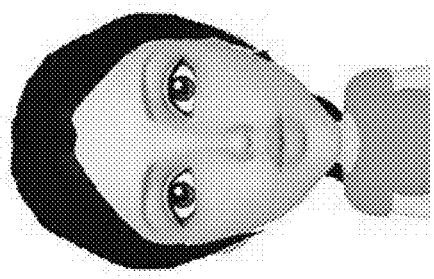

FIGS. 17 and 18 illustrate examples of morph targets c_JD and c_PK. The c_JD morph target shows the activation of an action unit to drop the jaw open. The c_PK morph target shows the activation of an action unit to pucker. Unlike the previous examples, these morph targets are not isolated to a single side of the face or direction, but rather affect both sides of the face. A prefix of "x2_" indicates a two-way corrective (or "x3" for a three-way corrective), which combines two base shapes. In certain embodiments, correctives are standardized within a file format, such that each file within the format contains the same base shapes and corrective combinations. In many embodiments, affix-based corrective schemes can be generalized to be fully user-defined across multiple pre-defined base shapes (e.g., shapes following the FACS convention). For example, if the user creates x3_LCP_JD_FN, the system can automatically detect that it is a 3-way corrective between these three base shapes (LCP, JD and FN). Standardized file formats in accordance with many embodiments of the invention can be extended (e.g., by third parties) to include additional correctives for which weights can be generated based on images of a user's face.

Figure 19:
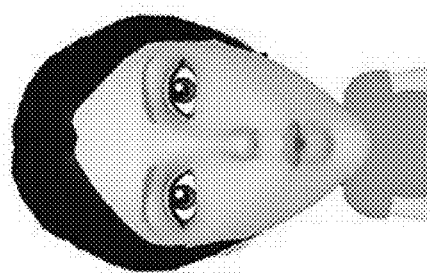
FIG. 19 illustrates the activation of a morph target for a corrective shape of a 3D model.

Correctives are often useful for correcting certain rendering errors that can arise when multiple action units are activated together. In some embodiments, the two base shapes are dialed to 100%, then any correction delta is saved as an "x2_". To control the value of an "x2" is multiplicative math. For example, x2_c_JDxPK is Jaw Drop combined with Pucker. If you set JD to 1 (1 being 100%) and PK to 1, the value of x2_c_JDxPK=1. If JD=0.5 and PK=0.5, x2_c_JD_PK=0.25. In some embodiments, include suffixes for geometry and joints. FIG. 19 illustrates an example of a corrective x2_c_JDxPK. Corrective x2_c_JDxPK corrects the pucker when the mouth is open. Other examples of morph targets are included in an appendix filed with this application.

The modified file formats allow users of this mapper framework to design a wide range of characters—human and non-human—with the set of morph targets in the modified file format. The key flexibility is for the designers of the characters to sculpt both base shapes and corrective shapes which gives them complete control over the design and movement of the character. Mappers in accordance with a number of embodiments of the invention automatically generate weights for the morph targets that match a user's facial movements and expressions. The use of such a format can allow designers to not only have increased control over the expressions of their characters, but to be able to use their characters with any mapper in accordance with such embodiments of the invention. In such a manner, the mappers can function across a wide range of characters (i.e., any character that is built with the modified specification).

Although, a particular model file format in accordance with the illustrated embodiment is described above, other model file formats in accordance with other embodiments of the invention may be used depending on the requirements of the particular system implemented. For example, although particular affixes are described, different affixes can be used in accordance with various embodiments of the invention.

Although the present invention has been described in certain specific aspects, many additional modifications and variations would be apparent to those skilled in the art. It is therefore to be understood that the present invention may be practiced otherwise than specifically described, including any variety of models of and machine learning techniques to animate the 3D shape of human faces to mimic facial movements, without departing from the scope and spirit of the present invention. Thus, embodiments of the present invention should be considered in all respects as illustrative and not restrictive.

What is claimed is:

1. A system for generating animations for a 3D model, the system comprising:
    a set of one or more processors;
    memory readable by the set of processors; and
    instructions stored in the memory that when read by the set of processors directs the set of processors to:
        identify a first set of landmarks from a first set of one or more images of a user's face;
        identify a neutral frame based on the identified set of landmarks;
        identify a second set of landmarks from a second set of one or more images of the user's face;
        classify a facial expression of the user's face in the second set of images based on the identified neutral frame and the second set of landmarks;
        identify a set of one or more predefined expression weights based on the facial expression; and
        calculate a set of final morph target weights from the predefined expression weights and the second set of landmarks based on the second set of images, wherein the 3D model is animated based on the calculated set of final morph target weights for morph targets of the 3D model.

2. The system of claim 1, wherein identifying the neutral frame comprises:
    classifying a facial expression of the user's face in the first set of images;
    adjusting the first set of landmarks for the classified expression to an estimated neutral expression; and
    setting the adjusted set of landmarks as a neutral expression.

3. The system of claim 2, wherein classifying a facial expression comprises identifying an expression state based on the identified set of landmarks.

4. The system of claim 2, wherein adjusting the first set of landmarks comprises:
    identifying an expected ratio between two sets of facial landmarks for the classified facial expression; and
    adjusting the first set of landmarks based on a difference between the expected ratio for the classified facial expression and an expected ratio for a neutral facial expression.

5. The system of claim 1, wherein the first set of landmarks are identified using at least one of a mnemonic descent method (MDM) deep learning approach and an ensemble of regression trees (ERT) approach.

6. The system of claim 1, wherein calculating the set of final morph target weights comprises:
    calculating a set of initial morph target weights for the second set of images based on the second set of landmarks; and
    blending the set of initial morph target weights and the predefined expression weights to compute the set of final morph target weights.

7. The system of claim 1, wherein the morph targets of the 3D model comprise a set of one or more base shapes and a set of one or more corrective shapes.

8. The system of claim 1, wherein the morph targets of the 3D model are stored in a standardized model file format.

9. The system of claim 1, wherein the instructions further direct the set of processors to adjust the identified neutral frame based on second set of images.

10. The system of claim 1, wherein the instructions further direct the set of processors to calculate a second set of final morph target weights based on a third set of one or more images, wherein the transition between the first set of final morph target weights and the second set of final morph target weights is based on a linear function to control the rate of morphing between different expressions.

11. A method for generating animations for a 3D model, the method comprising:
    identifying a first set of landmarks from a first set of one or more images of a user's face;
    identifying a neutral frame based on the identified set of landmarks;
    identifying a second set of landmarks from a second set of one or more images of the user's face;
    classifying a facial expression of the user's face in the second set of images based on the identified neutral frame and the second set of landmarks;
    identifying a set of one or more predefined expression weights based on the facial expression; and
    calculating a set of final morph target weights from the predefined expression weights and the second set of landmarks based on the second set of images, wherein the 3D model is animated based on the calculated set of final morph target weights for morph targets of the 3D model.

12. The method of claim 11, wherein identifying the neutral frame comprises:
    classifying a facial expression of the user's face in the first set of images;
    adjusting the first set of landmarks for the classified expression to an estimated neutral expression; and
    setting the adjusted set of landmarks as a neutral expression.

13. The method of claim 12, wherein classifying a facial expression comprises identifying an expression state based on the identified set of landmarks.

14. The method of claim 12, wherein adjusting the first set of landmarks comprises:

identifying an expected ratio between two sets of facial landmarks for the classified facial expression; and adjusting the first set of landmarks based on a difference between the expected ratio for the classified facial expression and an expected ratio for a neutral facial expression.

15. The method of claim 11, wherein the first set of landmarks are identified using at least one of a mnemonic descent method (MDM) deep learning approach and an ensemble of regression trees (ERT) approach.

16. The method of claim 11, wherein calculating the set of final morph target weights comprises:

calculating a set of initial morph target weights for the second set of images based on the second set of landmarks; and blending the set of initial morph target weights and the predefined expression weights to compute the set of final morph target weights.

17. The method of claim 11, wherein the morph targets of the 3D model comprise a set of one or more base shapes and a set of one or more corrective shapes.

18. The method of claim 11, wherein the morph targets of the 3D model are stored in a standardized model file format.

19. The method of claim 11 further comprising adjusting the identified neutral frame based on second set of images.

20. The method of claim 11 further comprising calculating a second set of final morph target weights based on a third set of one or more images, wherein the transition between the first set of final morph target weights and the second set of final morph target weights is based on a linear function to control the rate of morphing between different expressions.

* * * * *